US008984627B2

(12) United States Patent
Ormazabal

(10) Patent No.: US 8,984,627 B2
(45) Date of Patent: Mar. 17, 2015

(54) NETWORK SECURITY MANAGEMENT

(75) Inventor: Gaston Ormazabal, New York, NY (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 552 days.

(21) Appl. No.: 12/981,900

(22) Filed: Dec. 30, 2010

(65) Prior Publication Data

US 2012/0174217 A1    Jul. 5, 2012

(51) Int. Cl.
H04L 29/00    (2006.01)
H04L 29/06    (2006.01)

(52) U.S. Cl.
CPC .................. *H04L 63/1458* (2013.01)
USPC .................. 726/22; 726/12; 726/13

(58) Field of Classification Search
CPC ............ H04L 63/1458; H04L 65/1006; H04L 63/1408; H04L 65/1066
See application file for complete search history.

(56) References Cited

U.S. PATENT DOCUMENTS

| 6,530,024 | B1 * | 3/2003 | Proctor ........................... 726/23 |
| 2005/0108567 | A1 * | 5/2005 | D'Souza et al. .............. 713/201 |
| 2007/0121596 | A1 * | 5/2007 | Kurapati et al. .............. 370/356 |
| 2008/0040801 | A1 * | 2/2008 | Buriano et al. ................. 726/22 |
| 2008/0127349 | A1 * | 5/2008 | Ormazabal et al. ............. 726/25 |
| 2009/0092131 | A1 * | 4/2009 | Hu et al. ........................ 370/356 |
| 2009/0265778 | A1 * | 10/2009 | Wahl et al. ....................... 726/13 |
| 2009/0288165 | A1 * | 11/2009 | Qiu et al. ......................... 726/23 |
| 2009/0310484 | A1 * | 12/2009 | Sisalem et al. ................ 370/230 |

FOREIGN PATENT DOCUMENTS

EP    2081356    *    7/2009    ............. H04L 29/06

OTHER PUBLICATIONS

E. Chen, "Detecting DoS Attacks on SIP Systems," VoIP MaSe 2006, IEEE, 6 pages.*
J. Rosenberg, et al. "SIP: Session Initiation Protocol," RFC 3261, Jun. 2002, 270 pages.*
S. Ehlert, et al. "Specification-based Denial-of-Service Detection for SIP Voice-over-IP Networks," The 3rd International Conference on Internet Monitoring and Protection, 2008, 8 pages.*
Ormazabal, Gaston, et al. "Secure sip: A scalable prevention mechanism for dos attacks on sip based voip systems." Principles, systems and applications of IP telecommunications. Services and security for next generation networks. Springer Berlin Heidelberg, 2008. 107-132.*
Nassar, Mohamed, and Olivier Festor. "Monitoring SIP Traffic Using Support Vector Machines." Recent Advances in Intrusion Detection. Springer Berlin Heidelberg, 2008.*
Lahmadi, Abdelkader, and Olivier Festor. "SecSip: a stateful firewall for SIP-based networks." Integrated Network Management, 2009. Im'09. IFIP/IEEE International Symposium on. IEEE, 2009.*

* cited by examiner

Primary Examiner — Techane Gergiso
Assistant Examiner — Robert Leung

(57) ABSTRACT

A method may include receiving session control messages and counting the session control messages of a same type having a same transaction identifier (ID). The method may further include blocking the session control messages of the same type having the same transaction ID when the count exceeds a threshold number. The method may further include determining whether the blocked session control messages are associated with an anomalous event and, when the blocked session control messages are not associated with the anomalous event, increasing the threshold number.

24 Claims, 17 Drawing Sheets

FIG. 3C

```
INVITE sip:bob@biloxi.com SIP/2.0
Via: SIP/2.0/UDP pc33.atlanta.com;branch=z9hG4bK776asdhds
Max-Forwards: 70
To: Bob <sip:bob@biloxi.com>
From: Alice <sip:alice@atlanta.com>;tag=1928301774
Call-ID: a84b4c76e66710@pc33.atlanta.com
CSeq: 314159 INVITE
Contact: <sip:alice@pc33.atlanta.com>
Content-Type: application/sdp
Content-Length: 142
```
HEADER 310

FIG. 3D

```
SIP/2.0 200 OK
Via: SIP/2.0/UDP server10.biloxi.com;
     branch=z9hG4bKnashds8; received=192.0.2.3
Via: SIP/2.0/UDP bigbox3.site3.atlanta.com;
     branch=z9hG4bK77ef4c2312983.1; received=192.0.2.2
Via: SIP/2.0/UDP pc33.atlanta.com;
     branch=z9hG4bK776asdhds; received=192.0.2.1
To: Bob <sip:bob@biloxi.com>;tag=a6c85cf
From: Alice <sip:alice@atlanta.com>;tag=1928301774
Call-ID: a84b4c76e66710@pc33.atlanta.com
CSeq: 314159 INVITE
Contact: <sip:bob@192.0.2.4>
Content-Type: application/sdp
Content-Length: 131
```
HEADER 311

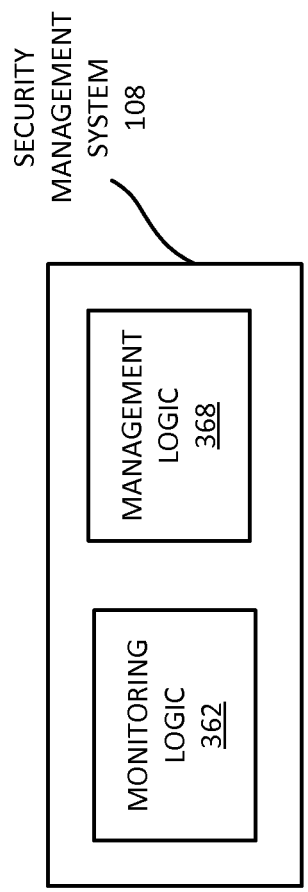

REQUEST TABLE 1402

| ADDRESS 1403 | DIALOG-ID 1404 | TRANSACTION ID 1410 | METHOD 1412 | COUNT 1414 | RATE 1416 | LOAD 1418 | TIMESTAMP 1420 |
|---|---|---|---|---|---|---|---|
| 1.2.3.4 | ea84b4c76e66710 | z9hG4bK776asdhds | INVITE | 1 | 1 | 10% | 658468981 |
| ... | ... | ... | ... | ... | ... | ... | ... |

FIG. 14A

RESPONSE TABLE 1422

| ADDRESS 1423 | DIALOG-ID 1424 | TRANSACTION ID 1430 | RESPONSE 1432 | COUNT 1434 | RATE 1436 | LOAD 1438 | TIMESTAMP 1440 |
|---|---|---|---|---|---|---|---|
| 1.2.3.4 | ea84b4c76e66710 | z9hG4bK776asdhds | TRYING | 1 | 5 | 15% | 15% |
| ... | ... | ... | ... | ... | ... | ... | ... |

FIG. 14B

OUT-OF-STATE TABLE 1442

| ADDRESS 1443 | DIALOG-ID 1444 | TRANSACTION ID 1450 | RESPONSE 1452 | COUNT 1454 | RATE 1456 | LOAD 1458 | TIMESTAMP 1460 |
|---|---|---|---|---|---|---|---|
| 1.2.3.4 | ea84b4c76e66710 | z9hG4bK776asdhds | RINGING | 1 | 5 | 15% | 15% |
| ... | ... | ... | ... | ... | ... | ... | ... |

FIG. 14C

NETWORK SECURITY MANAGEMENT

BACKGROUND INFORMATION

A communication network may employ a "session signaling" or "session control" protocol to create, modify, and terminate sessions (e.g., telephone calls, instant messaging conferences) among participants of the session. Session Initiation Protocol (SIP) is one such session signaling protocol, e.g., an application-layer protocol for creating, modifying, and terminating sessions.

It is not uncommon for malicious devices in a communication network to attempt to compromise the network, thereby preventing legitimate devices from enjoying the services of the network. Such an attack is called a "denial-of-service" (DoS) attack. When multiple devices, e.g., a botnet, launch a DoS attack, it is known as a Distributed DoS (DDos) attack. Malicious devices may target the network devices that employ the session signaling or session control protocols for creating, modifying, and terminating sessions.

BRIEF DESCRIPTION OF THE DRAWINGS

FIG. 3C is a diagram of an exemplary header in an INVITE message;

FIG. 3D is a diagram of an exemplary header of an OK message;

FIG. 13 is a block diagram of exemplary components of the security management system of FIGS. 1A and 1C;

FIG. 14A is a diagram of an exemplary table for storing information related to requests;

FIG. 14B is a diagram of an exemplary table for storing information related to responses to requests;

FIG. 14C is a diagram of an exemplary table for storing information related to out-of-state responses.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention, as claimed.

As discussed above, a communication network may employ a session control protocol to establish and terminate sessions between devices. In doing so, the network may employ a proxy to handle session signaling on behalf of a user device. The proxy may handle session signaling for many (e.g., thousands or millions) of devices. Therefore, overwhelming a proxy may deny service to thousands or millions of customers. Embodiments disclosed herein provide for a security system to reject session control messages when their number or the rate of receipt exceeds a threshold number or threshold rate, for example, while allowing other messages. In one embodiment, a security management system monitors the rejected messages and allowed messages to change the parameters of the security system. For example, the security management system may adjust the threshold number and/or the threshold rate used by the security system to reject or allow session control messages. These embodiments may implement hardware-based deep packet inspection (DPI) technology. These embodiments may further help thwart DoS and DDoS attacks. Embodiments disclosed below may allow for the detection of and prevention of DDoS attacks on the SIP signaling channel.

Many network providers are migrating to communication networks that employ session control protocols (e.g., SIP) and proxies. These networks include: (1) an all Internet Protocol (IP) network using SIP proxies; (2) an IP Multimedia Subsystem (IMS) network using SIP proxies; and (3) a Long Term Evolution (LTE) network with Voice over LTE using a SIP proxy. These and other networks are vulnerable to DoS and DDoS attacks. In these networks, protecting the proxy from a DoS attack may prove useful.

Figure 1A:
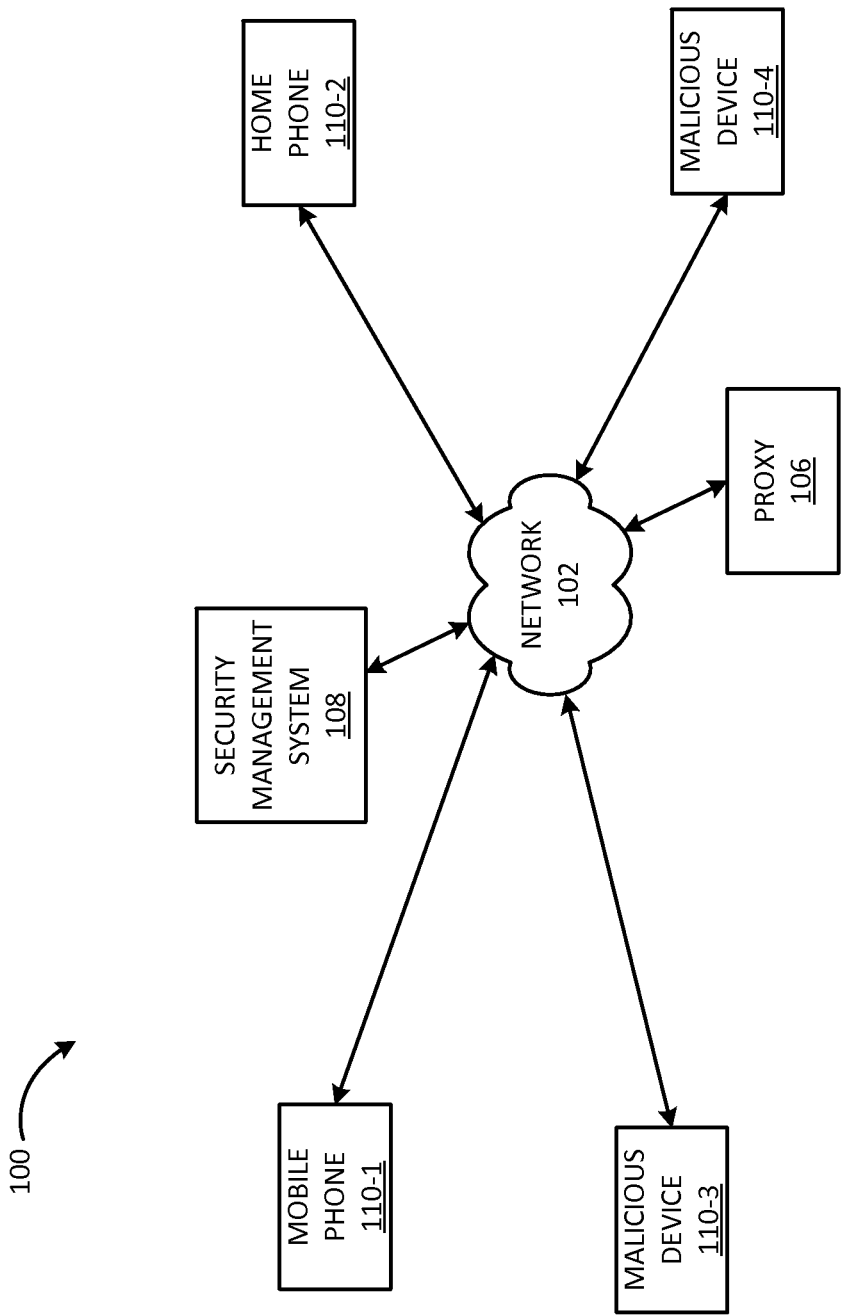
FIG. 1A is a block diagram of exemplary components of a network for implementing embodiments disclosed herein.

FIG. 1A is a block diagram of exemplary components of a network 100 for implementing embodiments disclosed herein. Network 100 includes a proxy 106, a security management system 108, and numerous devices 110 (individually, "device 110-x") coupled to a network 102. Devices 110 may include, for example, a mobile phone 110-1 and a home phone 110-2. Devices 110 may also include malicious devices 110-3 and 110-4.

In network 100, for example, the user of mobile phone 110-1 may wish to call home phone 110-2. The call, or session, may be established using proxy 106 and a session control protocol, such as SIP. Malicious devices 110-3 and/or 110-4, however, may try to disrupt network 100 (e.g., by attacking proxy 106) in a way that would prevent the call from mobile phone 110-1 to home phone 110-2 from going through. As described above, one type of attack that a malicious devices 110-3 and 110-4 may use is a DoS attack or a DDoS attack directed proxy 106.

Network 102 may include a wired or wireless network. Network 102 may include a wireless public land mobile network (PLMN) (e.g., a cellular network). The PLMN may include a Code Division Multiple Access (CDMA) 2000 PLMN, a Global System for Mobile Communications (GSM) PLMN, a Long Term Evolution (LTE) PLMN and/or other type of PLMN. In addition to a wireless network, network 220 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 102 may include a wireless satellite network.

Devices 110 may include mobile telephones, personal digital assistants (PDAs), laptop computers, desktop computers, tablet computers, or another type of computation or communication device. Devices 110 may connect to network 102 via wired, wireless, and/or optical connections. Devices 110 may include user agents (UAs) that implement SIP according to the Internet Engineering Task Force (IETF) document RFC 2543 and document RFC 3261.

Proxy 106 may include a device that facilitates the establishment, definition, and termination of sessions, such as telephone calls, on behalf of devices (e.g., devices 110). Proxy 106 may implement SIP according to the IETF document RFC 2543 and document RFC 3261. Proxy 106 may route requests to a user's location, authenticate and authorize users for services provided by proxy 106, implement call-routing policies, and provide other features to users.

Security management system 108 may monitor and manage network security devices in network 100. For example, as mentioned above, embodiments disclosed herein may reject session control messages when their number or the rate of receipt exceeds a threshold number or a threshold rate. In this embodiment, security management system 108 may adjust the threshold depending, for example, on network characteristics such as topology, latency, bandwidth, noise, etc. Security management system 108 may include one or more servers or computers for hosting programs or databases. For example, security management system 108 may host an SQL database for recording session control messages passing through network 100 for analysis.

SIP is a request/response protocol used for signaling in, for example, voice over IP networks. In SIP, the peer-to-peer relationship between two devices 110 is known as a "dialog." The dialog provides the context to facilitate exchange of messages between devices 110. Messages exchanged between devices 110 can be, for example, either a request or its associated responses. A request and its responses may be referred to as a "transaction." A dialog may include one or more transactions. Various requests are defined in SIP to provide different functionality. For example, an INVITE request is used to initiate a call and a BYE requests is used to end the call.

Figure 1B:
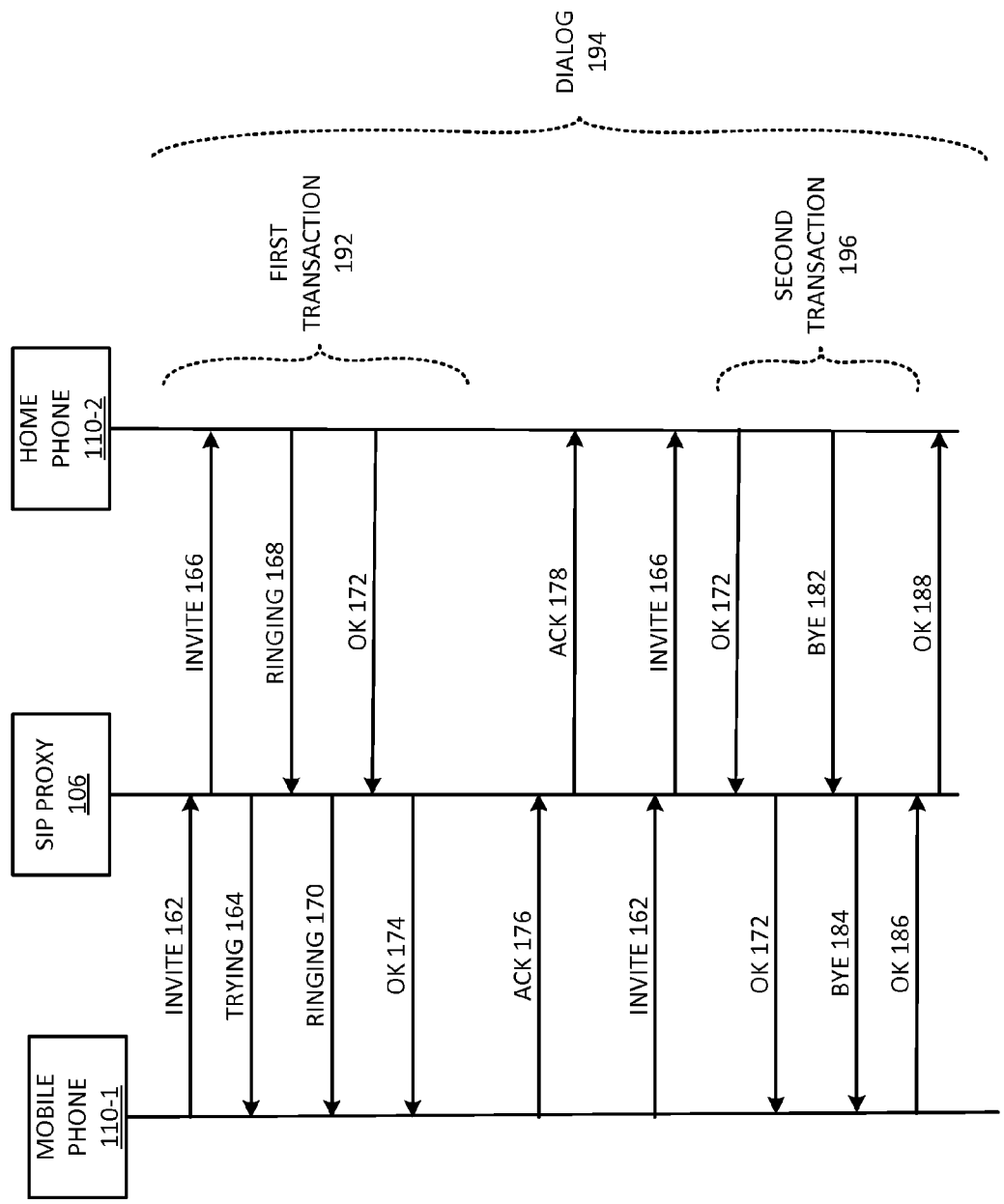
FIG. 1B is a signal diagram of exemplary messages sent between devices in the network of FIG. 1A.

FIG. 1B is a signal diagram of an exemplary dialog including transactions between mobile phone 110-1 and home phone 110-2. As shown, mobile phone 110-1 sends an INVITE request 162 to home phone 110-2 through proxy 106. Proxy 106 intercepts INVITE request 162 and returns a TRYING message 164 to mobile phone 110-1. Proxy 106 also forwards an INVITE request 166 to home phone 110-2. Home phone 110-2 responds with a RINGING message 168 to proxy 106, which proxy 106 forwards as RINGING message 170 to mobile phone 110-1. As further shown in FIG. 1B, if a call is established, home phone 110-2 sends an OK message 172 to proxy 106, which proxy 106 forwards to mobile phone 110-1 as OK message 174. Mobile phone 110-1 sends an ACK message 176 to proxy 106, and proxy 106 sends an ACK message 178 to home phone 110-2. Messages 162 through 174 may be considered a transaction ("first transaction 192") of a dialog 194 between mobile phone 110-1 and home phone 110-2.

If home phone 110-2 wishes to terminate the session, home phone 110-2 sends a BYE message 182 to proxy 106, and proxy 106 sends a BYE message 184 to mobile phone 110-1. In response, mobile phone 110-1 sends an OK message 186 to proxy 106, and proxy 106 forwards an OK message 188 to home phone 110-2. Messages 182 through 188 form another transaction ("second transaction 196") in dialog 194 between mobile phone 110-1 and home phone 110-2.

DoS attacks against SIP-based components (e.g., proxy 106), include three types of attacks: (1) attacks to exploit a protocol implementation flaw, (2) attacks to exploit application-layer vulnerabilities, and (3) attacks that flood a device with messages.

Implementation flaw attacks occur when a specific flaw in the implementation of a component (e.g., proxy 106) is exploited. For example, malicious device 110-4 may send a malicious packet to proxy 106 that causes unexpected behavior in proxy 106, resulting in proxy 106 being unable to service legitimate devices 110. The malicious packet may interact with the software or firmware in proxy 106 to cause the unexpected behavior. Unexpected behaviors include, for example, excessive memory use, excessive disk use, excessive processor use, a system reboot, or a system crash. The unexpected behavior may have resulted from inadequate testing of software running in proxy 106, improper maintenance of software running in proxy 106 (e.g., a bad software patch), etc. The vulnerability that causes the unexpected behavior may reside in various different levels of the network protocol stack, such as the TCP (Transmission Control Protocol) layer, the SIP layer, or in the underlying operating system.

Application-layer vulnerability attacks occur when a feature of the session control protocol (e.g., SIP) is manipulated to deny service to non-malicious users. In other words, a protocol manipulation attack occurs when an attacker sends a legitimate request that deviates from the intended purpose of the protocol in a way to overburden the proxy. These types of attacks include registration hijacking, call hijacking, and media modification.

Message flooding attacks occur when a large number of packets are sent to the component (e.g., proxy 106) in order to overwhelm the processing capacity of that component. In this case, the component is too busy to process all the non-attack, legitimate packets. Flooding attacks can occur from a single source, in the case of a DoS attack, or multiple sources in the case of a DDoS attack. In case of multiple sources, each attack from each source may individually go undetected, but the combined attack from the sources may overwhelm the component. A flooding attach may include signal flooding (e.g., INVITE requests) or media flooding. In signal flooding, a large amount of SIP requests may be sent to a SIP element.

In a typical DoS attack the source of the attack is usually a single server or a small network of servers. Such attacks may be successfully handled by IP address blocking (e.g., of a finite number of sources) and/or statistical methods involving traffic modeling and rate-limiting techniques at the IP network layer. A more complex attack, and far more difficult to combat, is the DDoS attack. In this case, a network of perhaps millions of unwitting computers (e.g., a "botnet") is commandeered to carry out an attack. Network- and transport-layer (e.g., layers 3 and 4) solutions may fail in such DDoS attacks because it is difficult to create whitelists and blacklists based on network address for millions of devices. Likewise, the statistical and rate limiting techniques may fail by an attack in which a single malicious packet is generated per malicious source. In this case, each malicious source may not appear malicious, but the aggregate flood of packets from a million hosts to the same target would clearly cause a flooding attack.

Figure 1C:
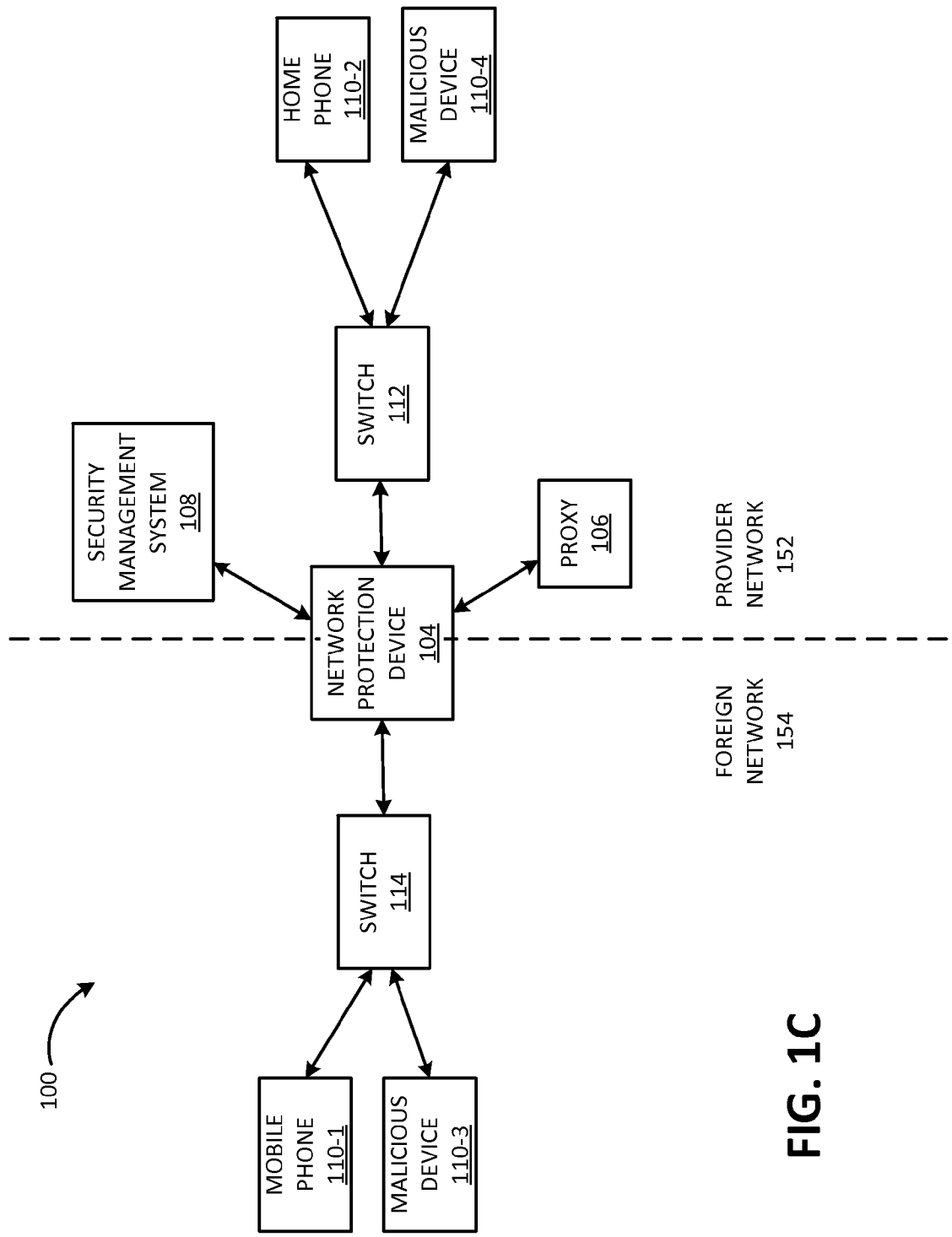
FIG. 1C is a block diagram of the network of FIG. 1A with more detail.

FIG. 1C is a block diagram of network 100 showing additional exemplary components. In addition to those components shown in FIG. 1A, FIG. 1C shows a network protection device 104 (NPD 104) and switches 112 and 114. FIG. 1C also shows network 100 divided into a provider network 152 and a foreign network 154.

In the embodiment shown, provider network 152 may provide devices 110 with communication services (e.g., using proxy 106). That is, the users of devices 110 in provider network 152 may subscribe to these services. Provider network 152 may deploy NPD 104 to protect provider network 152 from malicious devices in foreign network 154 (e.g., malicious device 110-3). In some embodiments, NPD 104 may also protect provider network 152 from malicious devices in provider network 152 (e.g., malicious device 110-4). In this embodiment, NPD 104 may protect proxy 106 against malicious network traffic, such as a DoS or DDoS attack. NPD 104 may be located to receive traffic from foreign network 154 (e.g., rather than proxy 106 receiving the traffic directly). NPD 104 may analyze and exert control over signaling messages intended for proxy 106. NPD 104 may also analyze and exert control over media streams intended for the media infrastructure (e.g., switch 112) in provider network 152. As shown in FIG. 1C, traffic directed towards proxy 106, from either foreign network 154 or provider network 152, may first go through NPD 104 before reaching proxy 106. NPD 104 may analyze traffic by performing deep packet inspection (e.g., at the application layer). Based on the analysis, the NPD 104 may determine whether to allow or reject packets (e.g., packets including session signaling or packets including media). NPD 104 is discussed in more detail below.

As described above, a DoS attack in network 100 may be directed at proxy 106. By overburdening the processors in proxy 106 with SIP messages, for example, malicious devices 110-3 and 110-4 may attempt to prevent other devices 110 from placing or receiving calls. With NPD 104, however, the process of examining each message for threats may be shifted in part from proxy 106 to NPD 104. In one embodiment, NPD 104 may include higher performance hardware than proxy 106 and may be better suited to handling a DoS attack. NPD 104, therefore, may decrease the processing load on proxy 106 so that proxy 106 may more adequately respond to legitimate traffic as opposed to DoS traffic. In one embodiment, proxy 106 determines whether to accept or reject (e.g., a Boolean determination) an incoming message. NPD 104 may also implement ultra-high speed deep-packet inspection, allowing network 100 to scale to handle real-world traffic volume. With ultra-high speed DPI technology, individual IP addresses may be marked as malicious, for example, even based on a single malicious packet, when application-layer information is obtained and processed for decision making at wireline speeds. In one embodiment, NPD 104 may reject session control messages when their number or the rate of receipt exceeds a threshold (e.g., a threshold number or a threshold rate). Security management system 108 may analyze the messages and the threshold(s) may be adjusted.

FIGS. 1A and 1C show exemplary components of network 100. In other implementations, network 100 may include fewer, additional, or a different arrangement of components. For example, network 100 may include additional proxies for receiving and forwarding session control messages. Network 100 may also include thousands or millions of devices 110. Further, in other implementations, any components of network 100 may perform the tasks performed by one or more other components of network 100.

Figure 2:
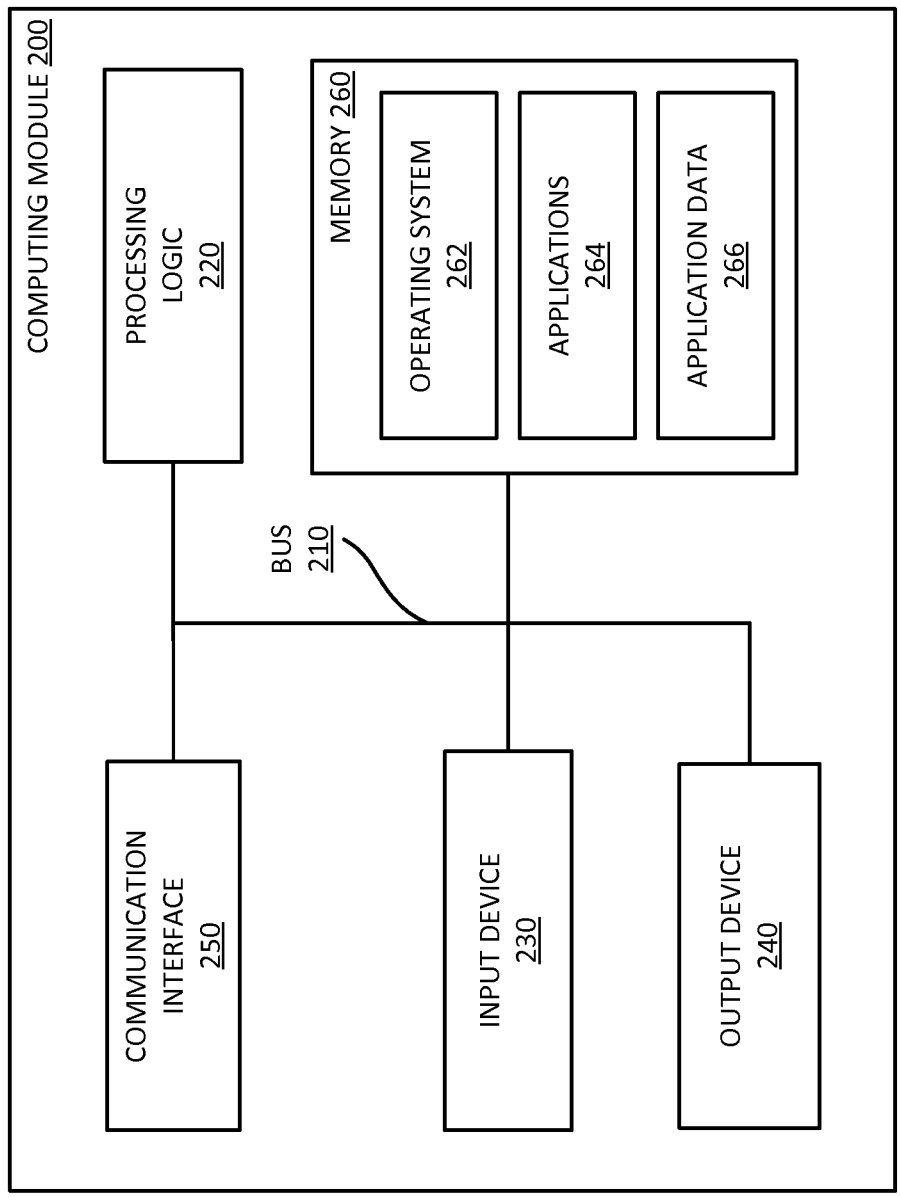
FIG. 2 is a block diagram of exemplary components of a computing module.

Devices in network 100 may each include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), a customized FPGA, etc.

Input device 230 may allow a user to input information into computing module 200. Input device 230 may include a keyboard, a mouse, a pen, a microphone, a remote control (e.g., remote control 260), an audio capture device, an image and/or video capture device, a touch-screen display, etc. Some devices, such as home phone 110-2 may include a keypad for entering telephone numbers when calling a party. Mobile phone 110-1 may include a keypad or a touch screen for entering numbers for calling a party. On the other hand, network protection device 104, and SIP proxy 106 may be managed remotely and may not include input device 230. In other words, some devices may be "headless" and may not include a keyboard, for example.

Output device 240 may output information to the user. Output device 240 may include a display, a printer, a speaker, etc. For example, mobile phone 110-1 may include a liquid-crystal display (LCD) for displaying information to the user, such as the name and/or number of a calling party. Headless devices, such as SIP server 106, NPD 104, and switches 114 and 112 may be managed remotely and may not include output device 240.

Input device 230 and output device 240 may allow a user to activate and interact with a particular service or application, such as telephone application to call a party. Input device 230 and output device 240 may allow a user to receive and view a menu of options and select from the menu options. The menu may allow the user to select various functions or services associated with applications executed by computing module 200.

Communication interface 250 may include a transceiver that enables computing module 200 to communicate with other devices or systems. Communication interface 250 may include a transmitter that converts baseband signals to radio frequency (RF) signals or a receiver that converts RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface, a radio-frequency identification (RFID) interface, a near-field communications (NFC) wireless interface, etc.

Memory 260 may store, among other things, information and instructions (e.g., applications 264 and operating system 262) and data (e.g., application data 266) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive). In one embodiment, memory 260 may include a content-addressable memory (CAM).

Operating system 262 may include software instructions for managing hardware and software resources of computing module 200. For example, operating system 262 may include Linux, Windows, OS X, OpenSolaris, Unix, etc. In the case of mobile phone 110-1, for example, operating system 262 may include MeeGo, Android, WebOS, iOS, Symbian, etc. Applications 264 and application data 266 may provide network services or include applications, depending on the device in which the particular computing module 200 is found.

Computing module 200 may perform the operations described herein in response to processing logic 220 executing software instructions contained in a computer-readable medium, such as memory 260. A computer-readable medium may include a physical or logical memory device. The software instructions may be read into memory 260 from another computer-readable medium or from another device via communication interface 250. The software instructions contained in memory 260 may cause processing logic 220 to perform processes that are described herein.

Figure 3A:
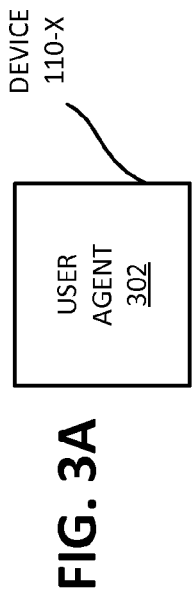
FIG. 3A is a block diagram of exemplary components of the devices of FIGS. 1A and 1D.

FIG. 3A is a block diagram of exemplary functional components of device 110-x. Devices 110 may each include a user agent 302. The components of device 110-x are shown for ease of understanding and simplicity. Device 110-x may include more, fewer, or a different arrangement of components.

User agent 302 may use a protocol (e.g., SIP) to establish, define, and terminate sessions with other devices. A session may include a lasting connection between two devices that may carry a stream of packets from one device to the other and/or vice versa. User agent 302 may perform the functions of a user agent client (UAC) and/or a user agent server (UAS). A UAC is a logical entity that creates a new request, and then uses client transaction state machinery to send it. The role of UAC may last for the duration of that transaction. In other words, if device 110-x initiates a request, user agent 302 acts as a UAC for the duration of that transaction. On the other hand, a UAS is a logical entity that generates a response to a SIP request. The response accepts, rejects, or redirects the request. The role of UAS may last for the duration of that transaction. In other words, if device 110-x responds to a request, user agent 302 acts as a UAS for the duration of that transaction.

When generating a SIP request, user agent 302 generates the request and the header for the request, such as the header to an INVITE message. FIG. 3C shows an exemplary SIP header 310 generated by user agent 302. Header 310 is the header for an INVITE message sent from Alice to Bob. Header 310 includes the following fields: a Via field, a To field, a From field, a Call-ID field, and a CSeq field. In addition to those fields, header 310 includes a request line or field (e.g., the first line of header 310), which includes the method (e.g., INVITE), a request-URI (e.g., bob@giloxi.com), and the SIP version (e.g. SIP/2.0). Header 310 is exemplary and may include additional or fewer fields. Further the information in header 310 is exemplary. The fields in header 310 are described in more detail below.

FIG. 3D shows an exemplary header 310 generated by user agent 302. Header 311 is the header for a 200 OK message sent from Bob to Alice. Header 311 includes the following fields: a Via field, a To field, a From field, a Call-ID field, and a CSeq field. In addition to those fields, header 311 includes a request line or field (e.g., the first line of header 311), which includes the method (e.g., 200 OK) and the SIP version (e.g. SIP/2.0). Header 311 is exemplary and may include additional or fewer fields. Further the information in header 311 is exemplary. The fields in header 311 are described in more detail below.

The Via field in headers 310 and 311 may include the address (e.g., pc33.atlanta.com) at which a user (e.g., Alice) is expecting to receive responses to the request. The Via field may also include a branch parameter that uniquely identifies this transaction.

The To field in headers 310 and 311 may include the desired or logical recipient of the request or the address-of-record of the user or resource that is the target of this request. For example, the To field may include a display name (e.g., Bob) and a SIP URI or SIPS URI (e.g., sip:bob@biloxi.com) to which the request is originally directed. If a dialog has already been established, the To field may include a To tag, which may identify the peer of the dialog. If the SIP request is outside a dialog, then the To field may not include a To tag.

The From field in headers 310 and 311 indicates the logical identity of the initiator of the request, possibly the user's address-of-record. For example, the From field may also include a display name (e.g., Alice) and a SIP URI or SIPS URI (e.g., sip:alice@atlanta.com) that indicate the originator of the request. The From field may also include a tag parameter that includes a string (e.g., a random string such as 1928301774) added to the URI by the originating user agent, for example. The string may be used for identification purposes.

The Call-ID field in headers 310 and 311 may acts as a globally unique identifier for a series of SIP messages, such as a series of SIP messages to establish a session. For example, the unique identifier for the session may be generated by the combination of a random string and the user agent's host name or IP address. The combination of the To tag, From tag, and Call-ID may completely define a peer-to-peer SIP relationship between originator (e.g., Alice) and target (e.g., Bob) and is referred to as a dialog.

The CSeq or Command Sequence field in headers 310 and 311 may serve as a way to identify and order transactions. For example, the CSeq field may include an integer and a method name. The integer may be incremented for each new request within a dialog and may include a traditional sequence number.

A SIP dialog may identified by a combination of the Call-ID, From tag, and To tag. A SIP transaction is identified by the branch parameter of the Via header and the Method name in the CSeq field. These fields can be used to construct respective dialog ID and transaction ID identifiers. In some embodiments, other fields may be used to identify a dialog or a transaction. For example, in one embodiment, the Call-ID field, the caller IP address, and the called IP address may be used.

Figure 3B:
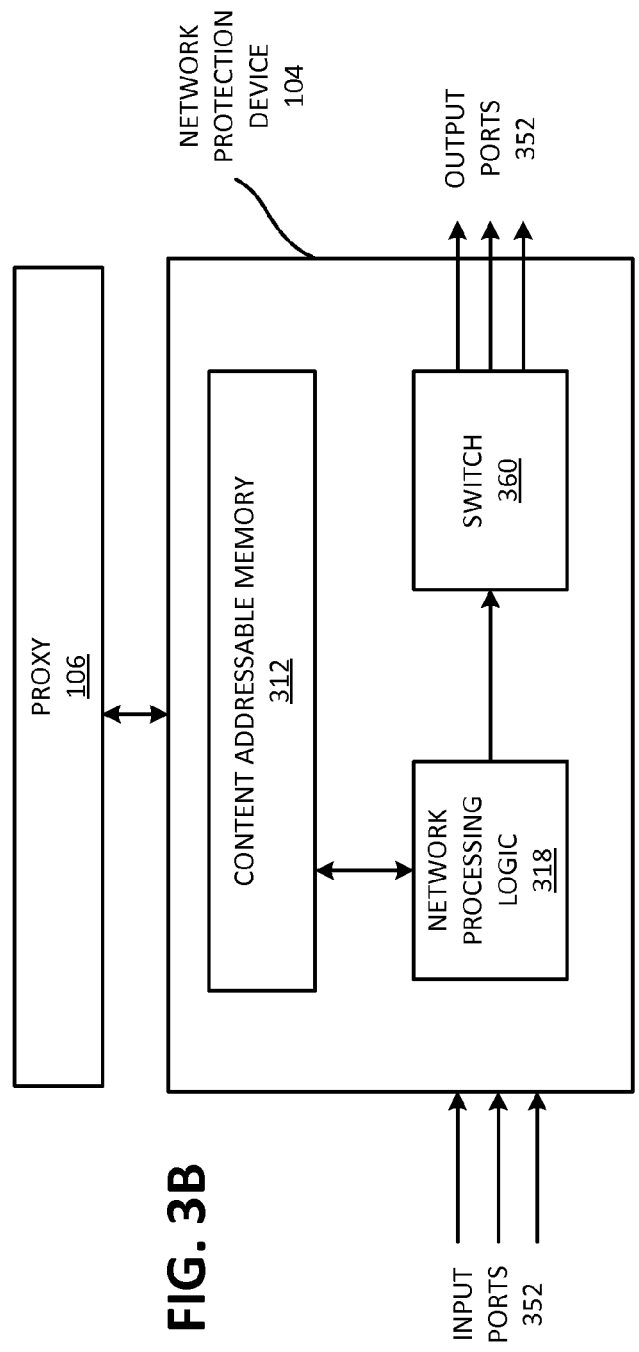
FIG. 3B is a block diagram of exemplary components of the network protection device of FIG. 1C.

FIG. 3B is a block diagram of exemplary components of NPD 104. NPD 104 may include content-addressable memory (CAM) 312, network processing logic 318, and switch 360. NPD 104 may be coupled to proxy 106, as also shown in FIG. 1C.

CAM 312 may be implemented in NPD 104 for its high-speed searching capabilities. CAM 312 may include a binary CAM, which stores information using a system of 0s and 1s. Alternatively, CAM 312 may include a ternary CAM (TCAM), which uses a system of 0s, 1s and *s (e.g., a do-not-care (DNC) state). Because of the DNC state, one input may match multiple entries in the TCAM. In case of multiple matches, TCAM may return the first match or indices of multiple matches. Entries present in TCAM may be compared in parallel and one match or an index of multiple matches may be returned by the TCAM. The lookup time for a CAM may be approximately 4-10 nanoseconds, for example.

Network processing logic 318 allows NPD 104 to extract and examine data from incoming SIP messages. Processing logic 318 may include an array of one or more central processing units capable of handling network related functions and performing deep packet inspection at carrier-class rates. In one embodiment, processing logic 318 extracts information to identify the dialog and transaction associated with a message. Network processing logic 318 may query tables stored in CAM 312 to determine if an ongoing dialog exists that corresponds to the received SIP message. Network processing logic 318 may also determine whether the received SIP message is out-of-state, for example.

Network processing logic 318 may include the Intel IXP 2800, which is capable of forwarding packets at 10 Gb/s. The IXP 2800 includes sixteen programmable, multi-threaded micro-engines that may support 23.1 giga-operations per second. Network processing logic 318 may include the XLS processor from RMI. Network processing logic 318 may include the C-Port processor family from Freescale. The XLS processor and the C-Port processor family may achieve deep packet inspection at rates greater than 10 Gb/s.

NPD 104 and SIP proxy 106 may also be implemented in the commercially available CloudShield™ CS-2000™ packet processing application server. The CS-2000 includes (1) a Deep Packet Processing Module (DPPM) and (2) an onboard Pentium-based Linux Application Server Module (ASM). NPD 104 may be implemented using the DPPM. The DPPM is based on the Intel IXP 2800 network processor and includes sixteen programmable data plane computers, a silicon database using CAM technology. CAM technology may allow fast comparisons because of its hardware implementation. The DPPM may act as a dynamic packet filter, peering at layers three and four of the received packet headers. The DPPM may also act as a dynamic packet filter peering at layer seven of the received packet headers.

Applications for the DPPM may be written in the high-level language called Rapid Application and Visualization Environment (RAVE) and may be converted into DPPM application logic for real-time execution. Proxy 106 may be implemented using the ASM portion of the CS-2000. Proxy 106 may be implemented using the "SIP-Proxy sipd" ("sipd proxy") software. A sipd proxy, for example, may be found in the Columbia InterNet Multimedia Architecture (CINEMA).

The components of NPD 104 are exemplary. NPD 104 may include additional, fewer, or a different arrangement of components. Further, any one component of NPD 104 may perform the functions described as being performed by one or more other components of NPD 104. For example, NPD 104 may include custom FPGA processors for processing incoming packets and querying a CAM.

Figure 4:
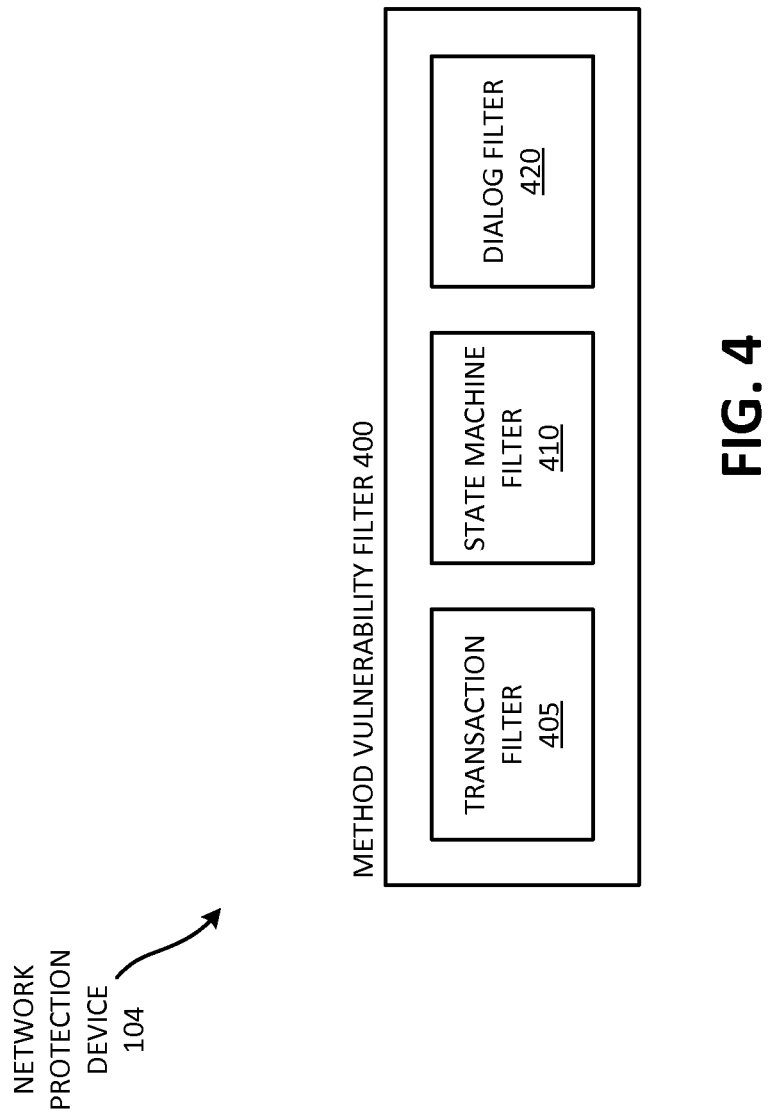
FIG. 4 is a block diagram of exemplary functional components of the network protection device of FIG. 1C.

FIG. 4 is a block diagram of the functional components of NPD 104. NPD 104 includes a method vulnerability filter 400. Method vulnerability filter 400 may limit the number or rate of messages (e.g., request messages and/or response messages) based on transaction ID, dialog ID, or the state of a transaction. Method vulnerability filter 400 may mitigate attacks that exploit protocol vulnerabilities to cause denial of service resulting from a flood of messages.

As shown in FIG. 4, method vulnerability filter 400 may include a transaction filter 405, a state machine filter 410, and a dialog filter 420. As discussed above, a SIP session may be associated with a dialog that may include one or more transactions. Transactions may be a client transaction or a server transaction, for example. Client and server transactions may be further divided into INVITE transactions and non-INVITE transactions. Thus, transaction filter 405 may perform filtering on a transaction basis, state machine filter 410 may filter out-of-state messages, and dialog filter 420 may perform filtering on a dialog basis. Additional details regarding transaction filter 405, state machine filter 410, and dialog filter 420 are provided below with respect to FIGS. 5-12.

Method vulnerability filter 400 may be applied at the dialog level and at the transaction level. As discussed above, a dialog may be identified by method vulnerability filter 400 by a combination of a Call-ID, a From tag, and a To tag. A transaction may be identified by method vulnerability filter 400 from a Branch parameter of a Via field, and from a Method name, and/or a command sequence in a CSeq field, for example. Method vulnerability filter 400 may use these fields to construct a dialog ID and a transaction ID that may, in turn, be used to maintain corresponding state information. The dialog ID and transaction ID may be of variable length. In order to generate a fixed length index in CAM 312 of NPD 104, a 32-bit cyclic redundancy check ("CRC" or "CRC-32") hash algorithm may be applied on a collection of the aforementioned fields to generate a unique hash that may be used as an index in the CAM tables for state keeping.

Method vulnerability filter 400 may include more, fewer, or a different arrangement of components that may permit detection and prevention of DoS attacks. In still other implementations, one or more components of method vulnerability filter 400 may perform the tasks performed by other components of method vulnerability filter 400.

Figure 5:
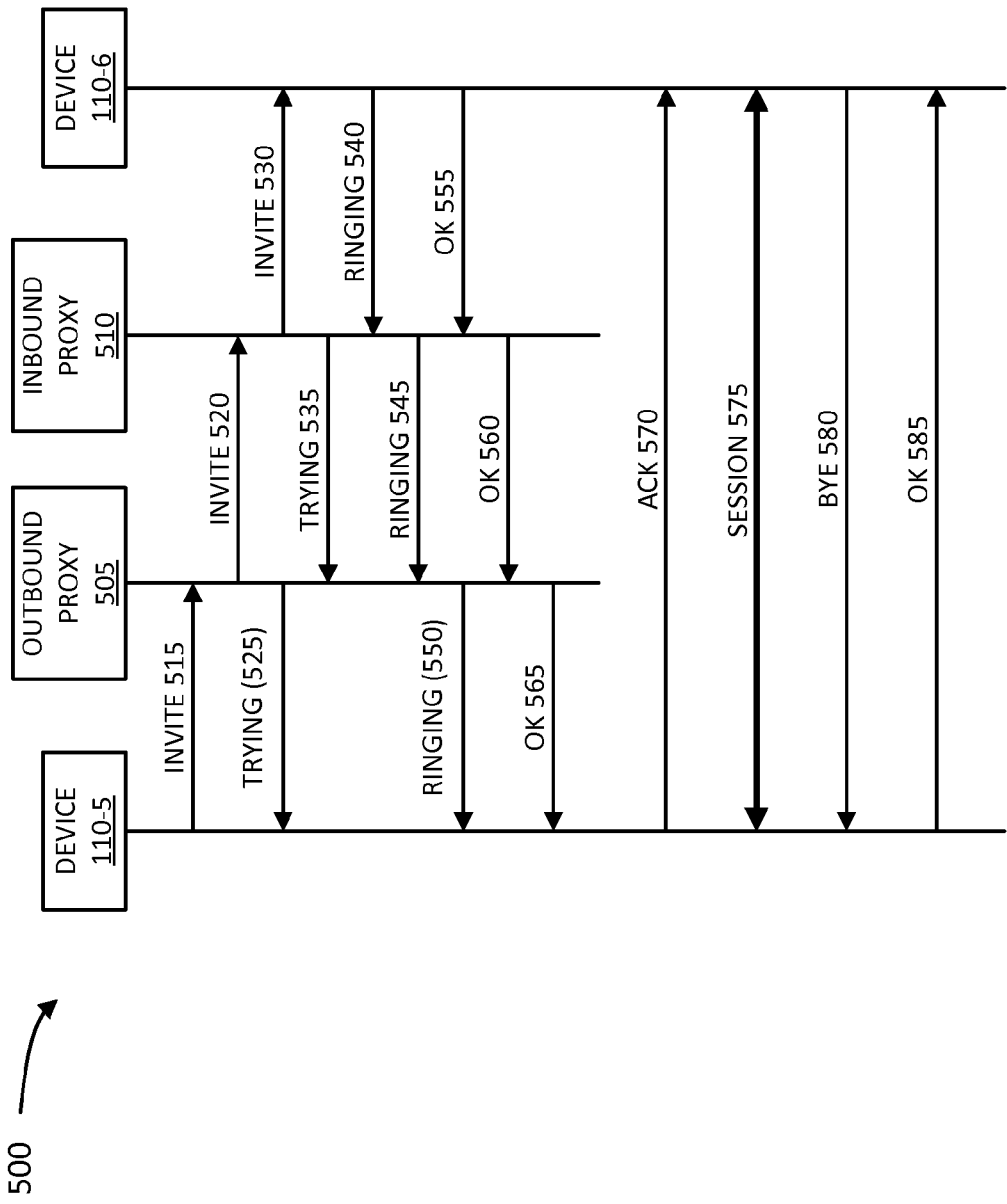
FIGS. 5 and 6 are signal diagrams of exemplary messages sent between devices in between devices in a network for establishing a session.
Figure 6:
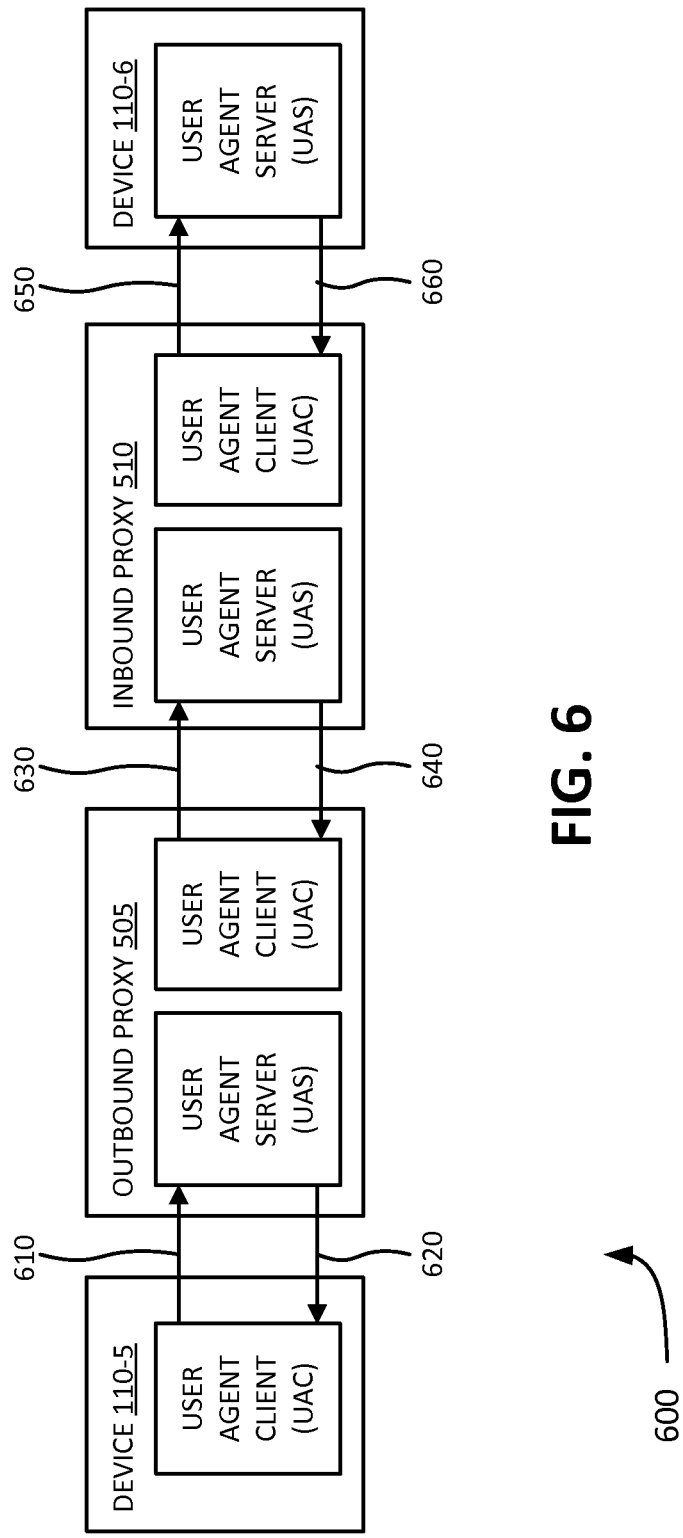

FIG. 5 is an exemplary call flow 500 between two clients 110, an outbound SIP proxy 505, and inbound SIP proxy 510. FIG. 6 is an exemplary diagram showing the interactions of the two devices 110, outbound SIP proxy 505, and inbound SIP proxy 510 of FIG. 5. As shown in FIG. 5, the device 110-5 may send an INVITE request 515 to outbound SIP proxy 505. Outbound SIP proxy 505 may send an INVITE request 520 to inbound SIP proxy 510, and may send a TRYING message 525 to device 110-5. Inbound SIP proxy 510 may send an INVITE request 530 to device 110-6, and may send a TRYING message 535 (e.g., a "100" message) to outbound SIP proxy 505. Device 110-6 may send a RINGING message 540 (e.g. a "180" message) to inbound SIP proxy 510, inbound SIP proxy 510 may send a RINGING message 545 to outbound SIP proxy 505, and outbound SIP proxy 505 may send a RINGING message 550 to device 110-5. If device 110-6 is available and accepts the call, device 110-6 may send an OK message 555 (e.g., a "200" message) to inbound SIP proxy 510. Inbound SIP proxy 510 may send an OK message 560 to outbound SIP proxy 505, and outbound SIP proxy 505 may send an OK message 565 to device 110-5. Device 110-5 may send an ACK message 570 to device 110-6, and a session 575 (e.g., a call) may be established between the two devices 110-5 and 110-6. If media session 575 is terminated by device 110-6, device 110-6 may send a BYE message 580 to device 110-5, and device 110-5 may return an OK message 585 to device 110-6.

Call flow diagram 500 may be further depicted by an interaction diagram 600 depicted in FIG. 6. As shown, device 110-5 may include a user agent client (UAC) that sends a request 610 (e.g., INVITE request 515) to a user agent server (UAS) of outbound SIP proxy 505. The UAC of device 110-5 may receive responses 620 (e.g., TRYING message 525, RINGING message 550, OK message 565, etc.) from the UAC of outbound SIP proxy 505. From the perspective of outbound SIP proxy 505, request 610 and responses 620 may be deemed an INVITE server transaction.

Transaction filter 405 may infer that an INVITE server transaction may include an incoming INVITE request (e.g., INVITE request 515) and outgoing messages (e.g., TRYING message 525, RINGING message 550, OK message 565, etc.). Thus, in one embodiment, transaction filter 405 may limit the number or the rate of messages involved in the INVITE server transaction to a threshold number or threshold rate of INVITE messages (e.g., incoming), a threshold number or threshold rate of TRYING message(s) (e.g., outgoing), a threshold number or threshold rate of RINGING message(s)

(e.g., outgoing), and a threshold number or threshold rate of OK message(s) (e.g., outgoing). Transaction filter 405 may filter (e.g., reject) messages that do not conform to the threshold number or threshold rate established for each respective message. Thus, transaction filter 405 may help thwart a DoS attacker from amplifying a message rate and flooding a SIP proxy by playing man-in-the-middle. Further, transaction filter 405 may prevent a DoS attacker from sending false response messages (e.g., responses 620) to a device.

As further shown in FIG. 6, outbound SIP proxy 505 may include a UAC that sends a request 630 (e.g., INVITE request 520) to a UAS of inbound proxy server 510. The UAC of outbound SIP proxy 505 may receive response messages 640 (e.g., TRYING message 535, RINGING message 545, OK message 560, etc.) from the UAS of inbound SIP proxy 510. From the perspective of outbound SIP proxy 505, request message 630 and response messages 640 may be deemed an INVITE client transaction.

In one embodiment, transaction filter 405 may infer that an INVITE client transaction may include an outgoing INVITE request (e.g., INVITE request 520) and incoming response messages (e.g., TRYING message 535, RINGING message 545, OK message 560, etc.). Thus, with regard to outbound proxy 505, transaction filter 405 may limit the number or rate of messages involved in the INVITE client transaction to a threshold number or threshold rate of INVITE messages (e.g., outgoing), a threshold number or threshold rate of TRYING message (e.g., outgoing), a threshold number or threshold rate of RINGING messages (e.g., outgoing), and/or a threshold number or threshold rate of OK messages (e.g., outgoing). Transaction filter 405 may filter (e.g., reject) messages that do not conform to the threshold number or threshold rate established for each respective message. Thus, transaction filter 405 may help thwart a DoS attacker from amplifying a message and flooding a SIP proxy by playing man-in-the-middle. Further, transaction server 405 may prevent a DoS attacker from sending false response messages (e.g., responses 640) to a SIP proxy, and may prevent a DoS attacker from sending INVITE messages at a very high rate by sniffing and spoofing packets.

With regard to inbound SIP proxy 510, transaction filter 405 may limit the number or rate of messages involved in the INVITE client transaction in a manner similar to the manner that transaction filter 405 limits messages involved in the INVITE server transaction, as described above.

As further shown in FIG. 6, inbound SIP proxy 510 may include a UAC that sends a request 650 (e.g., INVITE request 530) to a UAS of device 110-6. The UAC of inbound SIP proxy 510 may receive response messages 660 (e.g., RINGING message 540, OK message 555, etc.) from the UAS of device 110-6. From the perspective of inbound SIP proxy 510, request message 650 and response messages 660 may be deemed an INVITE client transaction. With regard to inbound SIP proxy 510, transaction filter 405 may limit the number or rate of messages involved in the INVITE client transaction in a manner similar to the manner that transaction filter 405 limits the number or rate of messages involved in the INVITE client transaction described above.

In the above embodiments, each threshold number or threshold rate may be the same (e.g., one INVITE message, one TRYING message, one RINGING message, and one OK message). In other embodiments, different thresholds may be used for each type of message. For example, INVITE messages may be limited to five messages with the same transaction ID. In one embodiment, the threshold number or threshold rate for each message may be based on different network parameters that define the complexity of the network. The complexity of the network may include the number of nodes or hops between devices 110, the latency between devices 110, and/or the jitter associated with the network 100, for example.

In one embodiment, only one SIP request message is allowed per transaction ID. Because of network conditions, however, in one embodiment the same request may be retransmitted a number of times. To allow for this, method vulnerability filter 400 (e.g., transaction filter 405) may provide a window of finite retransmissions before rejecting the packet. The number of finite retransmissions (e.g., five) may be selected to reduce the number of times legitimate messages are dropped (e.g., "false positives"). The number of finite retransmissions may also be selected to reduce the number of times malicious messages are allowed to pass (e.g., "false negatives). In one embodiment, the rate of requests per transaction per second is also checked not to exceed a selected finite number (e.g., six per second), after which messages are dropped. The rate at which messages are received in any state from a user agent may also be limited to a predefined rate, and handled within the state the user agent is in. Arbitrary error messages at high rates may also be blocked if the rate crosses a pre-determined threshold. The number of INVITE messages from a UAC may also be limited to a single call at a time (e.g., one session at a time), or to some particular value based on the size of an N-way conference.

The thresholds discussed above may also be changed by security management system 108, as discussed below.

In one embodiment, method vulnerability filter 410 may extract the dialog ID and the transaction ID from received messages (either request messages or response messages). Method vulnerability filter 410 may store this information in different and subordinate CAM tables. Because the dialog ID and transaction ID are variable length fields, as discussed above, a 32-bit CRC hash algorithm may be used to generate a fixed length index for the CAM tables. In one embodiment, the dialog ID stored in the CAM table may be generated by the hash of the following information: network address of the originating device, network address of the destination device, and the Call-ID. In one embodiment, the transaction ID stored in the CAM table may be generated by the hash of the following information: the branch identifier (e.g., in the top Via field) and the value of the command sequence in the CSeq field.

Figure 11A:
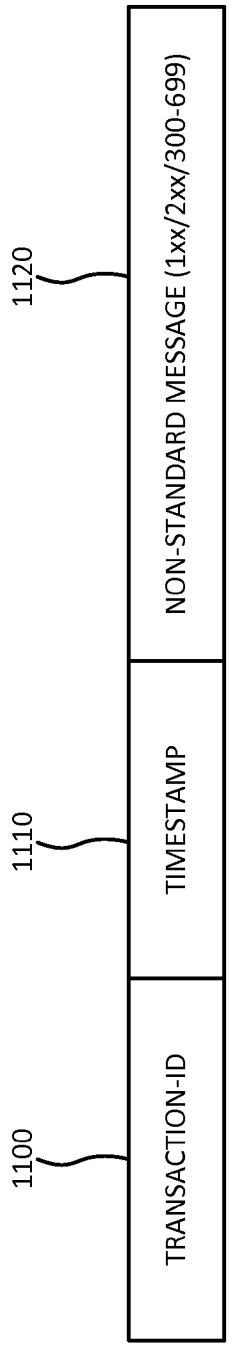
FIGS. 11A and 11B are block diagram for storing information about session control messages in the network of FIG. 1C.

Transaction filter 405 may also employ other limiting rules, e.g., limiting the rate or number of non-standard "1xx" messages (except "100" and "180" messages), limiting the rate or number of non-standard "2xx" messages (except "200" messages), or limiting the rate or number of "300-699" responses (e.g., to ten or ten per second). Such filtering may spare a proxy (e.g., proxy 106) from handling the filtered messages. As shown in FIG. 11A, transaction filter 405 may perform this filtering by maintaining a CAM table that includes a transaction ID field 1100, a timestamp field 1110, and a non-standard message (1xx/2xx/300-699) field 1120, and rejecting non-standard messages once the number of elements (e.g., rows) of the table of FIG. 11A reaches a predetermined number (e.g., ten or ten per second). For example, transaction filter 405 may verify the validity of an INVITE request by checking transaction ID field 1100, and rejecting the INVITE request if the transaction ID already exists. This may be accomplished by transaction filter 405 looking up the transaction ID of every new INVITE request in transaction ID field 1100 and rejecting the request if the transaction ID already exists in transaction ID field 1100.

Figure 11B:
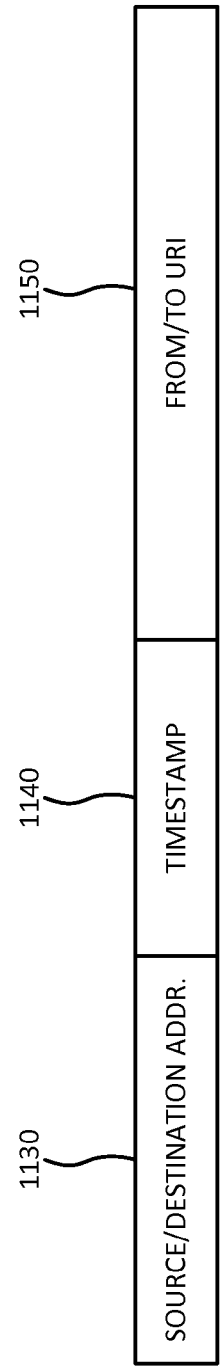

Transaction filter 405 may limit the number or rate of INVITE requests coming from a single source IP address with an identical From URI, in case of an outbound proxy, and may limit the rate or number of INVITE requests coming to a single destination IP and a To URI, for an inbound proxy. As shown in FIG. 11B, transaction filter 405 may accomplish this by maintaining a CAM table that includes a source/destination address field 1130, a Timestamp field 1140, and a From/To URI field 1150. In one embodiment, transaction filter 405 may determine whether a Timestamp difference between a new INVITE request and an identical INVITE in the CAM table is greater than a predetermined time (e.g., one second), and, if the Timestamp difference is less than the predetermined time, may reject the INVITE request. In another embodiment, transaction filter 405 may determine whether the number of entries in the CAM table is greater than a predetermined number (e.g., five), and, if the timestamp difference is greater than the predetermined time, may reject the INVITE request.

As stated above, state machine sequencing filter 410 of NPD 104 may filter messages based on transaction state machines. In one implementation, state machine filter 410 may be considered a transaction filter similar to transaction filter 405. FIGS. 7-10 depict exemplary transaction state machines for an INVITE server transaction 700, a SIP non-INVITE server transaction 800, an INVITE client transaction 900, and a SIP non-INVITE client transaction 1000, respectively.

Figure 7:
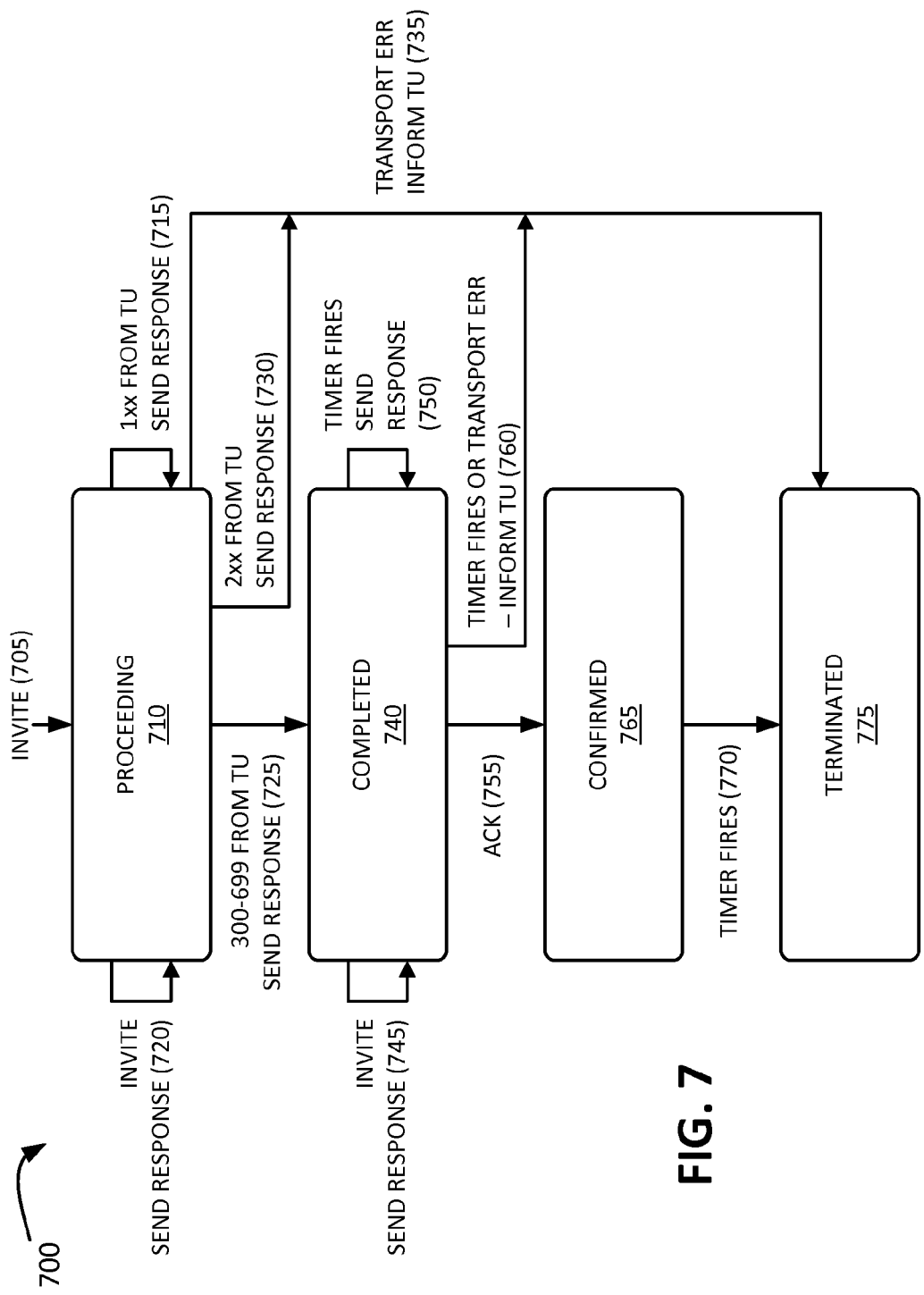
FIGS. 7-10 are state machine diagrams for the session initiation protocol (SIP)

As shown in FIG. 7, an INVITE 705 may be received during a proceeding state 710. If a "1xx" message is received from a transaction user (TU) in proceeding state 710, a corresponding response 715 may be generated. If INVITE 705 was forwarded in proceeding state 710, a corresponding response 720 may be generated. If "300-699" messages are received from the TU, a corresponding response 725 may be generated and INVITE server transaction 700 may enter a completed state 740. If a "2xx" message is received from the TU, a corresponding response 730 may be generated and INVITE server transaction 700 may enter a terminated state 775. If a transport error message is received, a response 735 informing the TU may be generated and INVITE server transaction 700 may enter terminated state 775. If INVITE 705 was forwarded in completed state 740, a corresponding response 745 may be generated. If a first timer fires or expires in completed state 740, a corresponding response 750 may be generated. It an ACK message 755 is received, INVITE server transaction may enter a confirmed state 765. If a second timer fires (or expires) or a transport error is received, a response 760 informing the TU may be generated and INVITE server transaction 700 may enter terminated state 775. If a third timer fires or expires 770, INVITE server transaction 700 may enter terminated state 775.

State machine filter 410 may maintain a state (e.g., CAM) table for INVITE server transaction 700 that includes proceeding state 710, completed state 740, confirmed state 765, and terminated state 775. The state (CAM) table may accept standard messages (e.g., TRYING, RINGING, and/or OK messages) to increment state.

Figure 8:
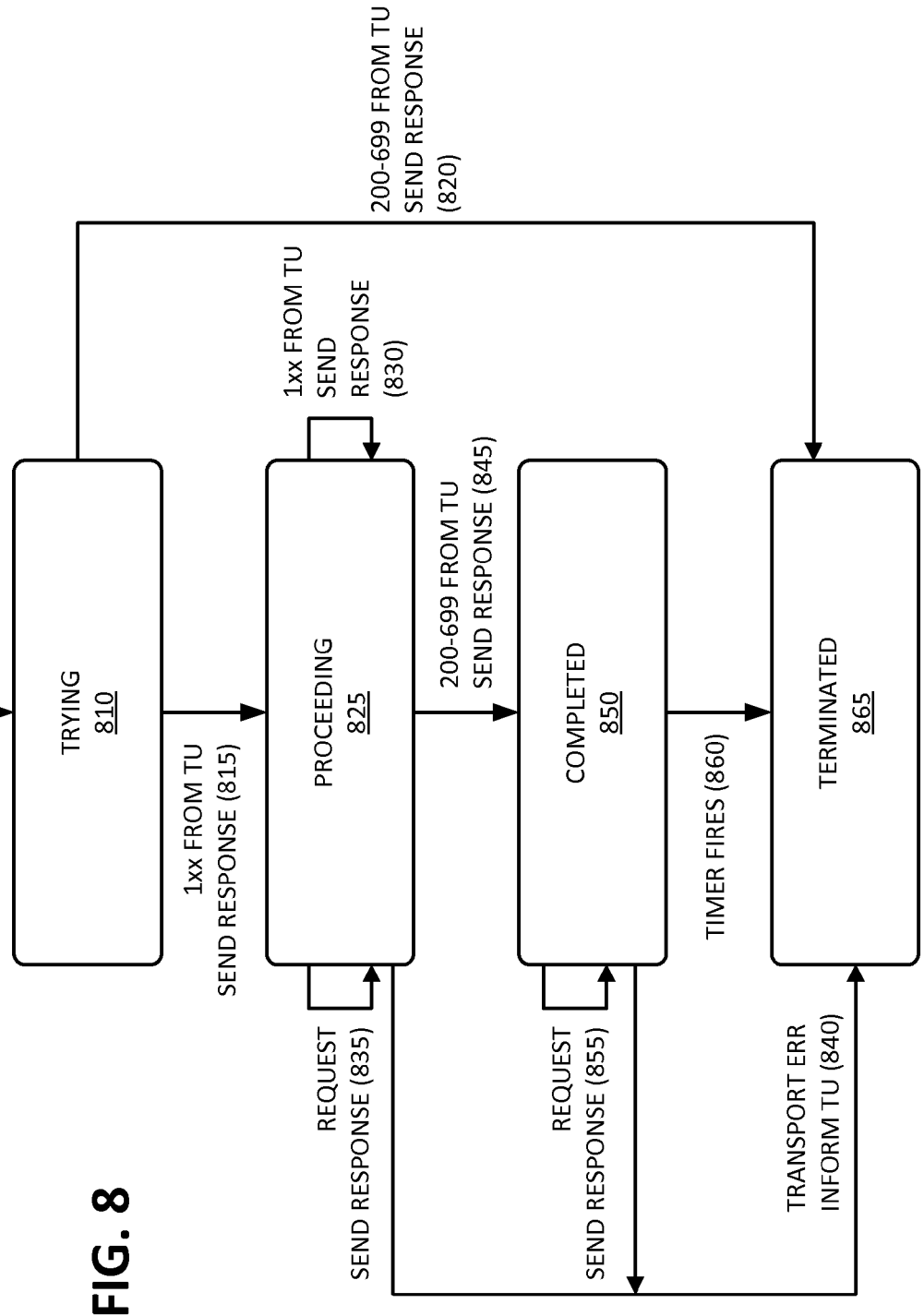

As shown in FIG. 8, a request 805 may be received and passed to a TU during a trying state 810. If a "1xx" message is received from the TU, a corresponding response 815 may be generated and SIP non-INVITE server transaction 800 may enter a proceeding state 825. If "200-699" messages are received from the TU, a corresponding response 820 may be generated and SIP non-INVITE server transaction 800 may enter a terminated state 865. If a "1xx" message is received from the TU in proceeding state 825, a corresponding response 830 may be generated. If request 805 is forwarded in proceeding state 825, a corresponding response 835 may be generated. If a transport error is received in proceeding state 825 or a completed state 850, a response 840 informing the TU may be generated and SIP non-INVITE server transaction 800 may enter terminated state 865. If "200-699" messages are received from the TU, a corresponding response 845 may be generated and SIP non-INVITE server transaction 800 may enter completed state 850. If request 805 is forwarded in completed state 850, a corresponding response 855 may be generated. If a timer fires or expires 860, SIP non-INVITE server transaction 800 may enter terminated state 865.

State machine filter 410 may maintain a state (e.g., CAM) table for SIP non-INVITE server transaction 800 that includes trying state 810, proceeding state 825, completed state 850, and terminated state 865. The state (CAM) table may accept standard messages (e.g., TRYING, RINGING, and/or OK messages) to increment state. State machine filter 410 may provide generic handling of "1xx" and "200-699" messages to increment state.

Figure 9:
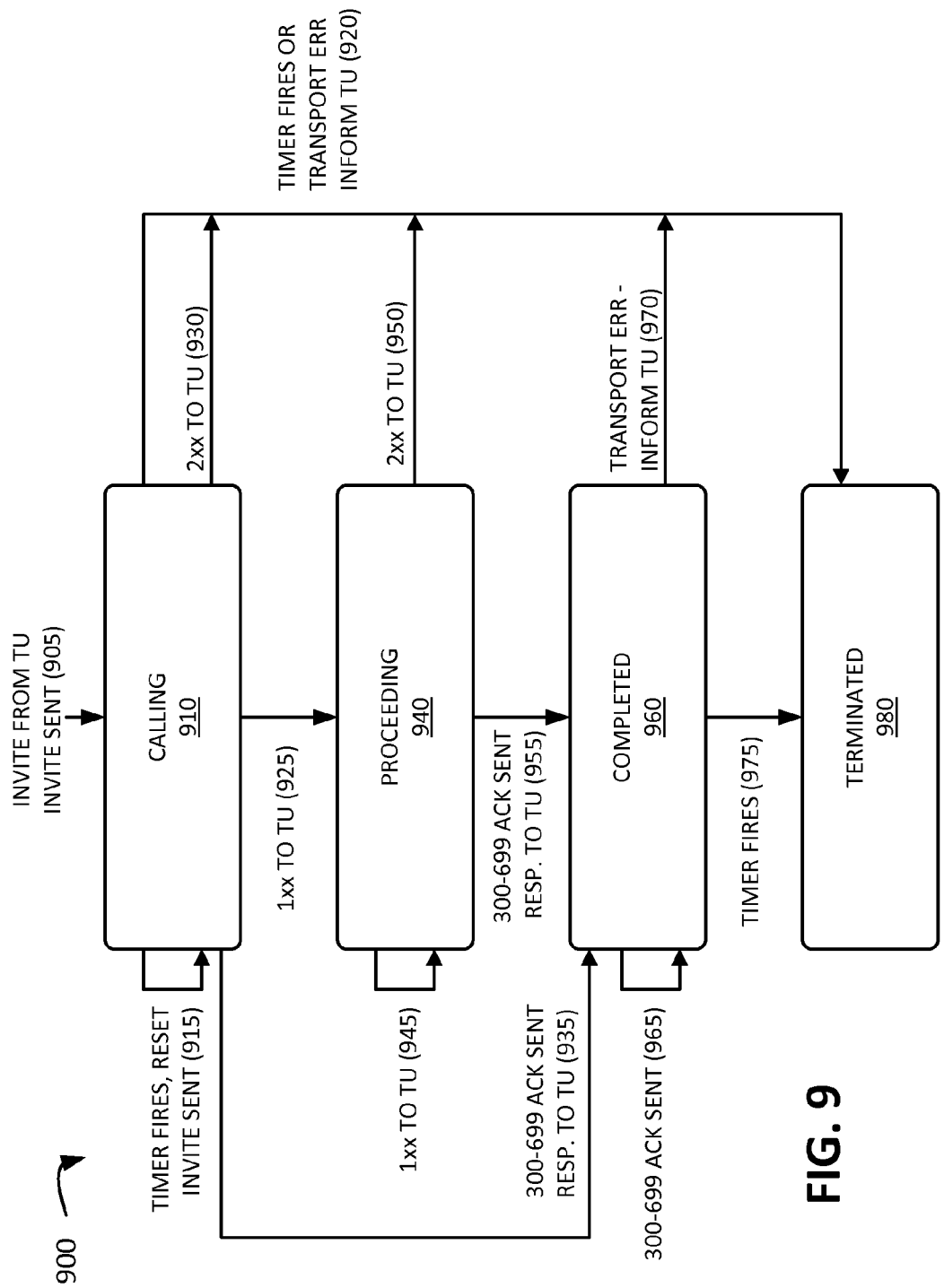

As shown in FIG. 9, an INVITE 905 may be received from the TU and sent during a calling state 910. If a first timer fires or expires in calling state 910, the first timer may be reset and an INVITE 915 may be sent. If a second timer fires (or expires) or a transport error is received in calling state 910, a response 920 informing the TU may be generated and INVITE client transaction 900 may proceed to a terminated state 980. If a "1xx" message 925 is sent to the TU, INVITE client transaction 900 may enter a proceeding state 940. If a "2xx" message 930 is sent to the TU in calling state 910, INVITE client transaction 900 may proceed to terminated state 980. If a "300-699" ACK message is sent in calling state 910, a corresponding response 935 may be sent to the TU and INVITE client transaction 900 may proceed to a completed state 960. If a "1xx" message is sent in proceeding state 940, a corresponding response 945 may be generated. If a "2xx" message 950 is sent to the TU in proceeding state 940, INVITE client transaction 900 may proceed to terminated state 980. If a "300-699" ACK message is sent in proceeding state 940, a corresponding response 955 may be sent to the TU and INVITE client transaction 900 may proceed to completed state 960. If a "300-699" ACK message is received in completed state 960, a corresponding response 965 may be generated. If a transport error occurs in completed state 960, a response 970 informing the TU may be generated and INVITE client transaction 900 may proceed to terminated state 980. If a third timer fires or expires 975 in completed state 960, INVITE client transaction 900 may enter terminated state 980.

State machine filter 410 may maintain a state (e.g., CAM) table for INVITE client transaction 900 that includes calling state 910, proceeding state 940, completed state 960, and terminated state 980. The state (CAM) table may accept standard messages (e.g., TRYING, RINGING, OK, and/or ACK messages) to increment state.

Figure 10:
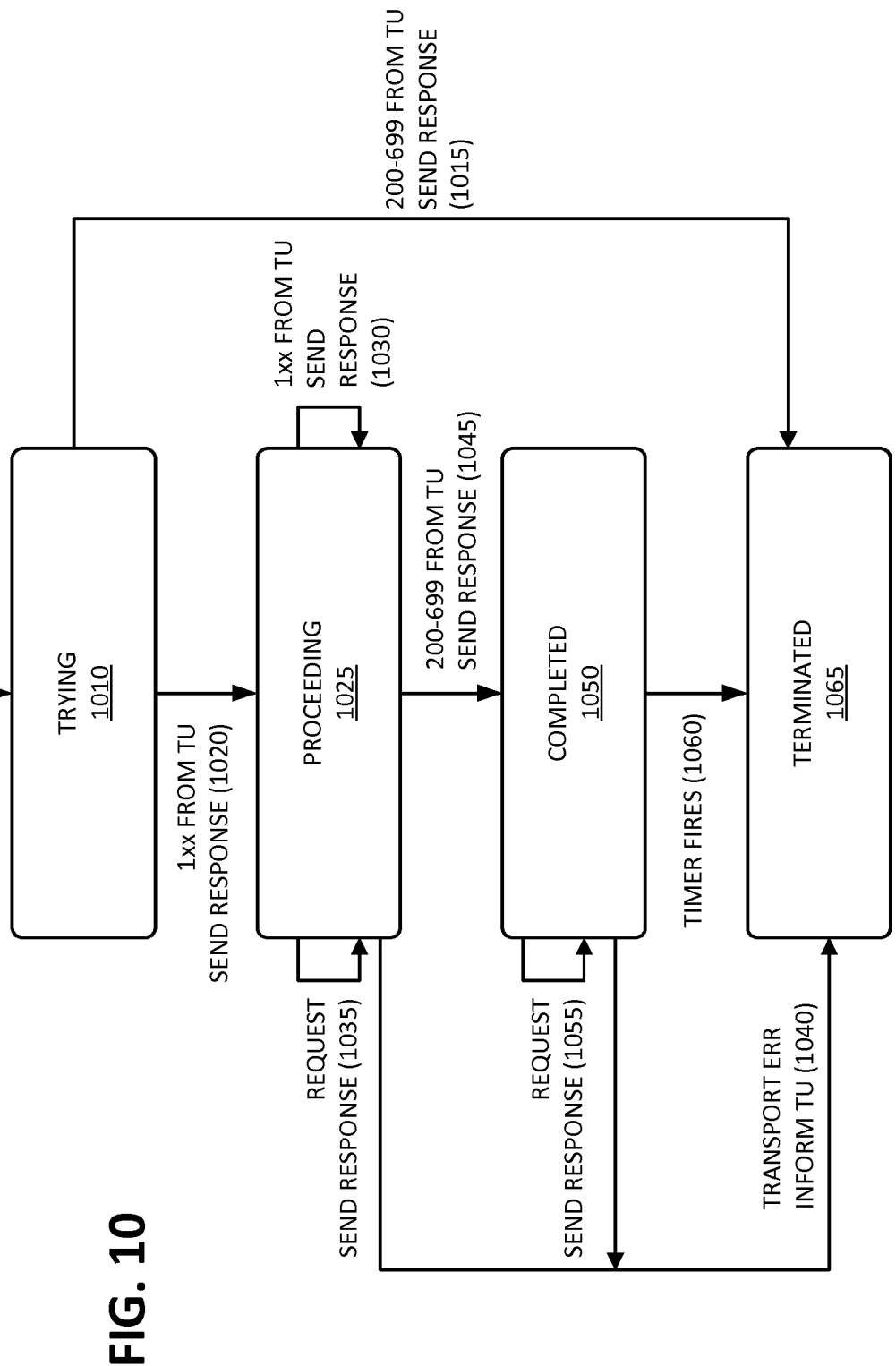

As shown in FIG. 10, a request 1005 may be received and passed to a TU during a trying state 1010. If "200-699" messages are received from the TU, a corresponding response 1015 may be generated and SIP non-INVITE client transaction 1000 may enter a terminated state 1065. If a "1xx" message is received from the TU, a corresponding response 1020 may be generated and SIP non-INVITE client transaction 1000 may enter a proceeding state 1025. If a "1xx" message is received from the TU in proceeding state 1025, a corresponding response 1030 may be generated. If request 1005 is forwarded in proceeding state 1025, a corresponding response 1035 may be generated. If a transport error is received in proceeding state 1025 or a completed state 1050, a response 1040 informing the TU may be generated and SIP non-INVITE client transaction 1000 may enter a terminated state 1065. If "200-699" messages are received from the TU, a corresponding response 1045 may be generated and SIP non-INVITE client transaction 1000 may enter completed state 1050. If request 1005 is forwarded in completed state 1050, a corresponding response 1055 may be generated. If a timer fires or expires 1060, SIP non-INVITE client transaction 1000 may enter terminated state 1065.

State machine filter 410 may maintain a state (e.g., CAM) table for SIP non-INVITE client transaction 1000 that includes trying state 1010, proceeding state 1025, completed state 1050, and terminated state 1065. The state (CAM) table may accept standard messages (e.g., TRYING, RINGING, and/or OK messages) to increment state. State machine filter 410 may provide generic handling of "1xx" and "200-699" messages to increment state.

For implementing the above state tables, state machine filter 410 may maintain the state according to the transaction state machine specified in document RFC 3261 for client and server INVITE and non-INVITE transactions by maintaining a table that includes a transaction ID field, a timestamp field, a state field, an acceptable message codes field, and a next state field. There may be more than one next state field, depending on the message that is received (e.g., NOTIFY in an INVITE dialog). The state tables of state machine filter 410 may include a start state of the state machine, legal states with values of acceptable message codes in each state and a corresponding next state for each pair (e.g., current state, acceptable message code, etc.), etc. State machine filter 410 may allow in-state messages and may filter out-of-state messages based on the state tables. Further, if an acceptable message is received, state machine filter 410 may increment the current state to the next legal state and may forward the packet to SIP proxy 130. Thus, state machine filter 410 may prevent a DoS attacker from sending spoofed out-of-state messages.

In one embodiment, a CAM table entry may be maintained for each INVITE message, and the state may be incremented for each user agent. In this manner, the filter accepted messages corresponding only to the next allowed state, or any termination message. A timeout filter may also be used to terminate a session after a predetermined interval. Upon receiving a new subsequent status message, if the status message record is valid then the request may be accepted, if bogus, the message may be dropped.

State machine filter 410 may validate the state of each SIP transaction for each message received. The use of a regular expressions engine (e.g., in the CS-2000) may allow for validation of every arriving message as "in-state" or "out-of-state" in one CPU cycle. Messages that result in invalid states may be dropped (e.g., rejected) and the transaction state may always be maintained in a legitimate state. The DPPM made an entry for the first transaction request, and logged all subsequent status messages in a buffer, on a per transaction basis. Each received packet may be added to the status messages table for the original transaction. If the received status message fit a valid state pattern, it may be accepted; if the received status message is an invalid pattern, the message may be dropped.

As noted above, method vulnerability filter 400 may extract the dialog ID and transaction ID from an incoming packet, and compare the extracted dialog ID and transaction ID with the dialog ID table and subordinate transaction ID table stored in the CAM databases. If a corresponding entry already exists, then the message type was previously entered in a transaction message code log. For example, the string formed by the sequence of messages {INVI_100_180_180_200}, may match the rules list INVI(_100)*?(_180)*?_200{0,1}?(\x00){4}} that codify the SIP state machine prestored regular expression rules. The use of wild cards in regular expression syntax (e.g., an asterisk or question mark) may provide for validation of all permutations of allowed states in a single operation. If a match is found, the new arriving message matches the state validation rules, and is passed to the proxy. Otherwise, the packet is rejected and may also be removed from a transaction message log, e.g., in the sequence {INVITE, 100, 180, 200, 180, 200}. In this example, the filters will only allow the sequence {INVITE, 100, 180, 200}, while the last {180, 200} messages are removed, as the second 180 was already out of state.

Figure 12:
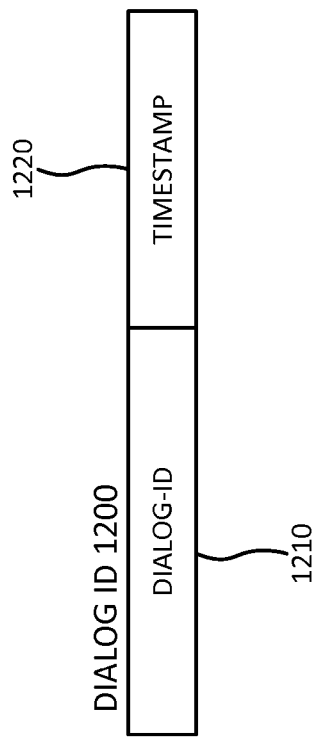
FIG. 12 is a block diagram for storing information about session control messages with respect to a dialog in the network of FIG. 1C.

Dialog filter 420 may provide dialog-level filtering to identify BYE or CANCEL messages. Dialog filter 420 may use the dialog ID of a dialog to identify a BYE or CANCEL message, and may reject a BYE or CANCEL message if it is not part of an existing dialog. Dialog filter 420 may accomplish such filtering by maintaining a dialog-ID table 1200, as shown in FIG. 12, that includes a dialog ID field 1210 and a timestamp field 1220. Dialog filter 420 may look up the dialog ID of an incoming BYE or CANCEL message in dialog-ID table 1200, and may reject the message if its dialog ID is not found in dialog-ID table 1200.

Returning to FIG. 4, method vulnerability filter 400 may also defend against specific method vulnerabilities (e.g., an INVITE attack, a BYE attack, a CANCEL attack, a Re-INVITE attack, a REFER attack, etc.). For example, an INVITE attack may be launched by flooding SIP proxy 130 with INVITE requests that contain the same transaction ID. Method vulnerability filter 400 may filter redundant INVITE messages by looking up the transaction ID of the INVITE message, and rejecting redundant INVITE messages if the transaction ID already exists in the state tables maintained in NPD 104. In one embodiment, method vulnerability filter 400 may filter INVITE messages by looking up the transaction ID of the INVITE message, and rejecting the INVITE message if the transaction ID appears more than a threshold number of times (e.g., five). A BYE attack may be launched, for example, if the attacker acquires SIP dialog/transaction parameters. In addition to filtering BYE messages based on dialog ID, method vulnerability filter 400 may filter BYE attacks by maintaining a table of participating URIs, and verifying whether the contact header field of the BYE message is one of the participating URIs.

In a CANCEL attack, an attacker may be able to generate a CANCEL request before a final response of a transaction. Method vulnerability filter 400 may verify CANCEL requests using the transaction and dialog parameters as set forth above for the BYE attack. If an attacker acquires the SIP parameters, however, the attacker may surpass this verification. Method vulnerability filter 400 may also employ IP security (IPSec) (i.e., a standardized framework for securing IP communications by encrypting and/or authenticating each IP packet in a data stream) or Transport Layer Security (TLS) (i.e., a cryptographic protocol which provides secure communications on the Internet) to successfully combat a CANCEL attack.

In a REFER attack, the referee in a REFER transaction may behave as an eavesdropper and may potentially manipulate the Referred-By header data. Method vulnerability filter 400 may combat this attack by using Secure/Multipurpose Internet Mail Extensions (S/MIME) (i.e., a standard for public key encryption and signing of e-mail encapsulated in MIME) to enable the REFER target to detect possible manipulation of the Referred-By header data.

FIG. 13 is a block diagram of security management system 108. Security management system 108 may include monitoring logic 362 and management logic 368. Monitoring logic 362 may retrieve information stored in CAM tables related to rejected messages. Management logic 368 may input information regarding accepted and rejected messages, and may adjust thresholds accordingly.

NPD 104 may record information regarding session control messages received that are rejected or passed on to proxy 106. FIGS. 14A-14C provide a means for recording this information. FIG. 14A is a diagram of an exemplary request table 1402. Request table 1402 stores information related to INVITE requests received in NPD 104. Request table 1402 may be stored in CAM 312, for example. For simplicity, only one record is shown in request table 1402. Each entry in request table 1402 records receipt of an INVITE request by NPD 104, for example. Network processing logic 318 may add and remove entries in request table 1402 as requests are received. As shown in FIG. 14A, request table 1402 includes a network address field 1403, a dialog ID field 1404, a transaction ID field 1410, a method field 1412, a count field 1414, a rate field 1416, a load field 1418, and a timestamp field 1420.

Network address field 1403 may store the network address (e.g, IP address) of source of the request message. Dialog ID field 1404 may identify a dialog between two user agents (e.g., UA 302 in two devices 110). In one embodiment, the dialog ID field is based on the Call-ID, From tag, and To tag from a corresponding message. As described above, the Call-ID and the From tag may be selected by the user agent that initiates a session. The To tag may be selected by the user agent invited to a session. The Call-ID, From tag, and To tag identify (e.g., uniquely) the dialog between the user agents. The Call-ID and From tag alone may also identify (e.g., uniquely) the dialog between the user agents. Further, the Call-ID alone may also identify (e.g., uniquely) the dialog between two user agents. In one embodiment, a hash function (e.g., CRC) may be applied to the Call-ID, the From tag, and the To tag to create a uniform length value for indexing CAM 312. In one embodiment, the dialog ID field 1404 may be based on the Call-ID, the source network address, and/or the destination IP address. In this embodiment, a hash function (e.g., CRC) may be applied to these values to create a uniform length value for indexing CAM 312.

Transaction ID field 1410 includes information to identify a transaction associated with the entry. In this embodiment, the transaction ID is provided by the branch parameter in the header of an ongoing SIP transaction. For example, as shown ion FIG. 14A, transaction ID field 1410 is z9hG4bK776asdhds, which corresponds to the branch parameter of header 310 of FIG. 3C. In one embodiment, the transaction ID may be identified by the branch value and information from the CSeq field. Information form the CSeq field may include the name of the command (e.g., INVITE) or the integer value of the command sequence. In one embodiment, a hash function (e.g., CRC) may be applied to the branch parameter, etc., to create a uniform length value for indexing CAM 312. In one embodiment, a table indexed by transaction ID may be a sub-table of an entry of a table indexed by dialog ID.

Method field 1412 includes the name of the request or function in a request message. As shown in FIG. 14A, method field 1412 is INVITE, which corresponds to the first line of header 310 of FIG. 3C. In one embodiment, request table 1402 does not include the method name. In one embodiment, method field 1412 only indicates the INVITE request if only INVITE requests are being monitored. In other embodiments, different requests may be indicated in method field 1412.

Count field 1414 may indicate how many messages have been received with the same dialog ID (e.g., field 1404) and the same transaction ID (e.g., field 1410). As shown in FIG. 14A, the count of the number of messages with the same transaction ID and dialog ID is 1.

Rate field 1416 may indicate the rate of messages received with the same dialog ID (e.g., field 1404) and the same transaction ID (e.g., field 1410) at the time the request message corresponding to the entry was received. The rate in field 1416 may be expressed as the number of requests per second, for example. Rate field may be calculated by network processing logic 318 based on information in count field 1414, timestamp field 1420, and other entries in request table 1402, for example.

Load field 1418 may store the processing load of the NPD 104 at the time of receipt of the corresponding request message. The "top" Linux command may be used for determining the load of the processor of NPD 104. As shown in FIG. 14A, load field 1418 indicates a load of 10% at the time of receipt of the corresponding message.

Timestamp field 1420 indicates the time at which the message corresponding to the entry in request table 1402 was received. The time in timestamp field 1420 may be expressed in seconds that have passed since a particular time, such as the time recording started.

FIG. 14B is a diagram of an exemplary response table 1422. Response table 1422 stores information related to responses received in NPD 104. Response table 1422 may be stored in CAM 312, for example. For simplicity, only one record is shown in response table 1422. Each entry in response table 1422 records receipt of a response by NPD 104 to a request, such responses to the requests listed in request table 1402, for example. Network processing logic 318 may add entries in response table 1422 as responses are received. As shown in FIG. 14B, response table 1422 includes a network address field 1423, a dialog ID field 1424, a transaction ID field 1430, a response field 1432, a count field 1434, a rate field 1436, a load field 1438, and a timestamp field 1440.

Network address 1423, Call-ID field 1424, From tag field 1426, To tag field 1428, and transaction ID field 1430 may store the same type of information as described above for corresponding fields 1403-1410 in request table 1402. Response field 1432 may store the name of the recorded response. For example, as shown in response table 1422, response field 1432 stores the name TRYING. Count field 1434, rate field 1436, and load field 1438, and timestamp field 1440 may store the same type of information as described above for corresponding fields 1434-1420 in request table 1402.

FIG. 14C is a diagram of an exemplary out-of-state table 1442. Out-of-state table 1442 stores information related to responses that are received in NPD 104 that are out-of-state. Response table 1402 may be stored in CAM 312, for example. Each entry in response table 1422 records receipt of a response by NPD 104 that is out-of-state, e.g., is not expected. Network processing logic 318 may add entries in request table 1412 as responses are received. As shown in FIG. 14C, out-of-state table 1424 includes a network address field 1443, a dialog ID field 1444, a transaction ID field 1450, a response field 1452, a count field 1454, a rate field 456, a load field 458, and a timestamp field 460.

Network address field 1443, dialog ID field 1404, and transaction ID field 1450 may store the same type of information as described above for corresponding fields 1403, 1404, 1410 in request table 1402. Response field 1452 may store the name of out-of-state response. For example, as shown in out-of-state table 1444, response field 1452 stores the name RINGING. Count field 1454, rate field 1456, load field 1458, and timestamp field 1460 in out-of-state table 1442 may store the same type of information as described above for corresponding fields 1414-1420 described above for request table 1402.

The fields and information stored in request table 1402, response table 1422, and out-of-state table 1442, are exemplary. Tables 1402, 1422, and 1442 may include more, fewer, different fields. For example, tables 1402, 1422, and/or 1442 may include fields for the destination network address, the source network address, the To tag, the From tag, etc. Further, in one embodiment, request table 1402, response table 1422, and out-of-state table 442 may be combined into one table, or one table with a series of sub tables, for example As discussed above, a dialog may be initiated by sending an INVITE request by the caller (e.g., mobile device 110-1) to the callee (home phone 110-2). In this case, the SIP header includes the Call-ID, which may form part of the dialog ID. The initial INVITE request, however, does not contain a To tag since at that time a full dialog has not yet been established and no peer exists. This situation may be considered an "early dialog." Any request sent within the scope of the dialog associated with the initial INVITE request includes the same Call-ID.

The SIP protocol allows re-INVITE requests to be issued to modify an existing session. The modification can involve changing addresses or ports, adding or deleting a media stream, etc. The modification is carried out by issuing a new INVITE request within the same dialog that established the session. This session modifying INVITE, known as the re-INVITE request, includes the same dialog ID and the same transaction ID as the initial INVITE. The re-INVITE occurs only once a dialog is established, e.g., after an ACK request. The sender of the re-INVITE may or may not include a new session description. In the latter case the first reliable non-failure response to the re-INVITE may contain the new session description. Hence, the re-INVITE may differ from the initial INVITE by including a new session description, or it may not include any session description.

SIP defines two types of responses: provisional and final. Final responses convey the result of the request processing, and are sent reliably (e.g., always sent). Provisional responses provide information on the progress of the request processing, but are not sent reliably (e.g., not always sent). The receipt of a final 2xx response may be acknowledged by sending an ACK request. Similarly the receipt of a provisional response may acknowledged by sending a PRACK (which stands for provisional acknowledgment). PRACK is similar to any non-INVITE request occurring within a dialog and hence needs to have the correct Call-ID for the session in which it exists.

Figure 15:
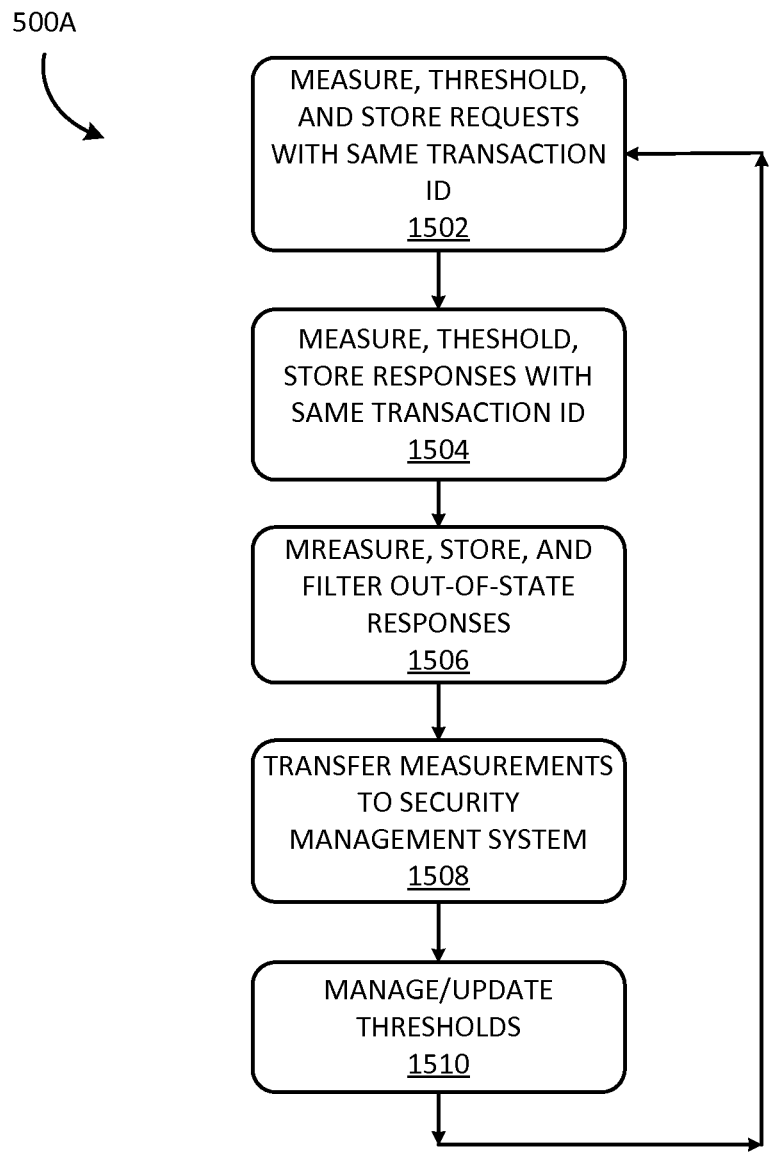
FIG. 15 is a flowchart of an exemplary process for providing security management.

FIG. 15 is a flowchart of a process 1500 for managing network 100. Process 1500 may begin with the measurement, thresholding, and storing information regarding requests with the same transaction ID and/or the same dialog ID (block 1502). As describe above, transaction filter 405 may filter request messages on a transaction basis, for example. As described above, transaction filter 405 determines the transaction ID and dialog ID of incoming request messages and may reject or accept a message based on the transaction and dialog ID. For example, transaction filter 405 may reject the tenth INVITE message including the same transaction ID. Transaction filter 405 may also limit the number or the rate of request messages having the same transaction ID. For example, transaction filter 405 may limit a transaction to a rate of six INVITE request messages per second and to a total of five INVITE messages total with the same transaction ID. Transaction filter 405 may store information about rejected and/or accepted request messages in request table 1402. In other embodiments, transaction filter 405 may limit such request messages to threshold greater than five (e.g., 6, 7, 8, 9, 10, etc.) or less than five (e.g., 1, 2, 3, or 4). In other embodiments, transaction filter 405 may limit request messages to a rate other than 6 per second (e.g., less than 6 or greater than 6 per second). As described above, transaction filter 405 may help thwart a DoS attack when an attacker amplifies or repeats a request message or a response message in an effort to flood an overwhelm proxy 106.

Network processing logic 318 may receive requests (e.g., INVITE requests) and transaction filter 405 may add corresponding records to request table 402. Thus, request table 402 may store information regarding request messages received (e.g., every INVITE message received). In one embodiment, a record of receiving each INVITE message of the attack may be recorded in request table 1402 for further analysis. Further analysis may reveal whether the blocked messages were part of an anomalous event, such as a DoS attack, for example.

Process 1500 may also measurement, threshold, and store information regarding request messages belonging to the same dialog ID but with different transaction IDs (block 1502). In this embodiment, network processing logic 318 may receive messages and dialog filter 420 may add corresponding records to request table 402. In one embodiment, dialog filter 420 rejects messages beyond a threshold number or a threshold rate. In one embodiment, dialog filter 420 only permits five messages per second for each dialog ID and rejects additional messages with the same dialog ID. In this manner, dialog filter 420 may rate limit messages to a threshold rate (e.g., 1, 3, 5, 8, 10, etc.) of request messages with the same dialog ID. Thus, dialog filter 420 may prevent a DoS attacker from altering transaction ID information for a dialog and flooding SIP proxy 106 by playing a man-in-the-middle attack.

Process 1500 may continue with the measurement, thresholding, and storing of information related to responses with the same transaction ID (block 1504). In this embodiment, network processing logic 318 may receive responses (e.g., TRYING responses) and transaction filter 405 may add corresponding records to response table 412. Thus, response table 412 may store information regarding every response received. In one embodiment, transaction filter 405 only permits one response (e.g., one TRYING response) for each transaction ID and rejects requests with redundant transaction IDs. In another embodiment, transaction filter 405 permits three, five, eight, ten, or fifteen responses having the same transaction ID and rejects other responses. In this manner, transaction filter 405 may rate limit response messages to a threshold number (e.g., 1, 3, 5, 8, 10, etc.) of request messages. In one embodiment, transaction filter 405 limits the rate of responses. When the rate of responses is exceeded, the responses may be blocked. The threshold rate of responses may be 1, 2, 3, 5, 6, 8, or 10 responses per second, for example.

Thus, transaction filter 405 my prevent a DoS attacker from amplifying an TRYING message and flooding SIP proxy 106 by playing a man-in-the-middle attack. Each response, however, may be recorded in response table 412 for further analysis. Further analysis may reveal whether the blocked messages were part of an anomalous event, such as a DoS attack.

Process 1500 may continue with the measurement and filtering of out-of-state responses (block 1506). In this embodiment, network processing logic 318 may receive responses (e.g., RINGING) and state machine filter 410 may add corresponding records to out-of-state table 442. Thus, out-of-state table 442 may store information regarding every out-of-state response received. State machine filter 410 may block out-of-state response messages to thwart a DoS attack. In this case, however, each INVITE message of the attack may be recorded in response table 412 for further analysis. Further analysis may reveal whether the blocked messages were part of an anomalous event, such as a DoS attack.

The measurements and data recorded with respect to blocks 1502, 1503, 1504, and 1506 may be transferred to security management system 108 (block 1508). Measurements and data may be transferred on real-time basis or a periodic basis, such as every minute, two minutes, three minutes, 10 minutes, 15 minutes, 60 minutes, etc. The data, stored in the CAM 312 in NPD 104, may be periodically sent to the ASM that communicates internally with network processing logic 318 and/or to security management system 108.

In one embodiment, security management system 108 may aggregate and store the data in an SQL-based database (e.g., in real time) for correlation and further analysis. Security management system 108 may analyze the data, which may trigger alarms. For example, a flood attack may trigger an alarm. The alarm may be triggered when the number of requests with the same transaction ID exceeding a threshold number, the rate of requests with the same transaction ID exceeding a threshold rate, the number of requests with the same dialog IDs exceeding a threshold, the rate of requests with the same dialog ID exceeding a threshold rate, the number of responses with the same transaction ID exceeding a threshold, the number of messages with invalid transaction or dialog IDs exceeding a threshold, or the number of out-of-state responses exceeds a threshold. For example, if there are more than five INVITE requests with the same dialog ID, then an alarm may sound.

The parameters of NPD 104 may be managed and thresholds may be updated (block 1510). For example, if network 100 is experiencing noisy conditions, then the threshold of the number of INVITE requests allowed with the same dialog ID may be increased from five to ten. If the analysis reveals that the blocked messages were part of a DoS, then the thresholds may be altered.

In one embodiment, the number of out-of-state message (as recorded in out-of-state table 1442) may determine the threshold values for transaction filter 405. That is, even though all out-of-state messages may be dropped (e.g., rejected), when the number of out-of-state messages passes a threshold, this information may help determine the state of network 100. More out-of-state messages may indicate a noisier network in which messages are lost and/or received out of order. In such a network, a user agent may wish to transmit more Re-INVITE messages to compensate for the noisy network. In this case, the threshold rate for Re-INVITE messages may be increased, for example. The number of out-of-state messages may be taken from across multiple dialogs and may be indicative of a noisy network. The number of out-of-state messages may also indicate a DoS attack is underway. In this case, if the number of out-of-state messages reaches another (e.g., higher) threshold, then the thresholds for the transaction filter 405 and dialog filter 420 may be decreased because of the threat of a DoS attack.

If the out-of-state messages occur across a broad range of dialogs, this may indicate a noisy network (e.g., the thresholds for transaction filter 405 and dialog filter 420 may be increased). If the out-of-state messages are high in some dialogs, but not in others, then this may indicate a DoS attack is underway (e.g., the threshold for transaction filter 405 and dialog filter 420 may be lowered).

Likewise, in situations where rejected messages from transaction filter 405 and dialog filter 420 are not broadly distributed across a broad range of dialogs, then a DoS may be inferred by management system 108 and thresholds may be raised. If the rejected messages are broadly distributed, then a noisy network may be inferred and thresholds may be lowered.

The threshold values may be selected to minimize false positives (e.g., rejecting of a non-attack message) and may depend on network conditions or network topology. For example, a "noisy" network may require a higher threshold than a less noisy counterpart. A high latency network may require a higher threshold than its speedier counterpart. The threshold values may also be selected to minimize false negatives (e.g., allowing an attack message). Increasing a threshold (e.g., the threshold number of INVITE messages) may reduce the number of false positives, while simultaneously increasing the number of false negatives. Likewise, decreasing a threshold (e.g., the threshold number of INVITE messages) may increase the number of false positives, while simultaneously decreasing the number of false negatives. In other words, there are tradeoffs with respect to changing the threshold values. Thus, security management system 108 may select the thresholds to optimize the system, for example. In one embodiment, a threshold may be increased to reach a 99% successful call rate (e.g., 99% of sessions are not associated with rejected session control messages that should have been allowed). Other successful call rates may be used, such as 98%, 98.5%, 99.5%, 99.9%, 99.99%, etc. A threshold may also be lowered until an acceptable level of false negatives is reached.

The foregoing description provides illustration and description, but is not intended to be exhaustive or to limit the embodiments to the precise form disclosed. Modifications and variations are possible in light of the above teachings or may be acquired from practice of the invention. For example, while series of acts have been described with regard to the flowcharts of FIGS. 15A-15C, the order of the acts may differ in other implementations. Further, non-dependent acts may be performed in parallel.

Although embodiments described herein in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP standard are examples of protocols that may be used for establishing a communications session among terminals, such as clients 110, connected to a network. Further, a combination of such protocols may be applied in various parts of the overall system.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items.

Further, the phrase "based on" is intended to mean "based, at least in part, on" unless explicitly stated otherwise.

What is claimed is:

1. A method comprising:
receiving session control messages;
counting the session control messages of a first type and counting the session control messages of a second type, wherein the first type of session control messages and the second type of session control messages have a same transaction identifier (ID);
blocking the session control messages of the first type having the same transaction ID when a count of the first type exceeds a first threshold number;
blocking the session control messages of the second type having the same transaction ID when a count of the second type exceeds a second threshold number,
wherein the first type is different than the second type and wherein the second threshold number is different than the first threshold number;
determining whether the blocked session control messages are associated with an anomalous event and, when the blocked session control messages are not associated with the anomalous event, increasing the first threshold number or the second threshold number;
counting, for each of a plurality of dialog IDs, a number of blocked session control messages;
determining a distribution of the number of blocked session control messages across the plurality of dialog IDs; and
changing the first threshold number or the second threshold number based on the distribution, wherein changing the first threshold number or the second threshold number based on the distribution includes:
increasing the first threshold number or the second threshold number based on the distribution of the number of blocked session control messages across the plurality of dialog IDs when the distribution is a first distribution; and
decreasing the first threshold number or the second threshold number based on the distribution of the number of blocked session control messages across the plurality of dialog IDs when the distribution is a second distribution,
wherein the first distribution is broader than the second distribution.

2. The method of claim 1, further comprising:
decreasing the first threshold number or the second threshold number when the blocked session control messages are associated with the anomalous event.

3. The method of claim 1, wherein the second threshold number is per an entire duration of session control messages having the same transaction ID, the method further comprising:
blocking the session control messages of the first type having the same transaction ID when a rate of receipt of the session control messages of the first type having the same transaction ID exceeds a threshold rate; and
increasing the threshold rate when the blocked session control messages are not associated with the anomalous event.

4. The method of claim 3, further comprising:
decreasing the threshold rate when the blocked session control messages are associated with the anomalous event.

5. The method of claim 1, wherein counting the session control messages of the first type having the same transaction ID includes counting, for each of a plurality of dialog IDs, the session control messages having a same transaction ID.

6. The method of claim 1, further comprising:
counting a number of out-of-state or blocked session control messages; and
changing the first threshold number or the second threshold number when the number of out-of-state or blocked session control messages exceeds a third threshold.

7. The method of claim 6, wherein counting the number of out-of-state or blocked session control messages includes counting, for each of the plurality of dialog IDs, a number of out-of-state session control messages, the method further comprising:
determining a distribution of the number of out-of-state session control messages across the plurality of dialog IDs; and
changing the first threshold number or the second threshold number based on the distribution of the number of out-of-state session control messages across the plurality of dialog IDs.

8. A network device comprising:
a receiver to receive session control messages;
a processor to:
count the session control messages having a same transaction identifier (ID),
block the session control messages having the same transaction ID when a count of the session control messages having the same transaction ID exceeds a threshold,
determine a number of blocked or out-of-state session control messages for a plurality of dialog IDs,
determine a distribution of the number of blocked or out-of-state session control messages across the plurality of dialog IDs, and
change the threshold based on the distribution of the number of blocked or out-of-state session control messages across the plurality of IDs; and
a memory to store the count of the session control messages, the number of blocked or out-of-state session control messages for the plurality of dialog IDs, the distribution of the number of blocked or out-of-state session control messages, and the threshold,
wherein the processor is configured to increase the threshold based on the distribution of the number of blocked or out-of state session control messages across the plurality of dialog IDs when the distribution is a first distribution,
wherein the processor is configured to decrease the threshold based on the distribution of the number of blocked or out-of state session control messages across the plurality of dialog IDs when the distribution is a second distribution, and
wherein the first distribution is broader than the second distribution.

9. The network device of claim 8, wherein the processor is configured to:
determine whether blocked session control messages are associated with an anomalous event and, when the blocked session control messages are not associated with the anomalous event, increase the threshold; and
decrease the threshold when the blocked session control messages are associated with the anomalous event.

10. The network device of claim 8, wherein the processor is configured to:
block session control messages having the same transaction ID when a rate of receipt of the session control messages having the same transaction ID exceeds a threshold rate;

determine whether blocked session control messages are associated with an anomalous event; and
increase the threshold rate when the blocked session control messages are not associated with the anomalous event.

11. The network device of claim 10, wherein the processor is further configured to decrease the threshold rate when the blocked session control messages are associated with the anomalous event.

12. The network device of claim 8, wherein the processor is configured to:
determine a number of blocked session control messages for the plurality dialog IDs,
determine the distribution of the number of blocked session control messages across the plurality of dialog IDs, and
change the threshold based on the distribution of the number of blocked session control messages.

13. The network device of claim 8, wherein the threshold is a first threshold, and wherein the processor is configured to:
determine the number of out-of-state session control messages for the plurality of dialog IDs; and
increase the first threshold when the number of the out-of-state session control messages exceeds a second threshold; and
decrease the first threshold when the number of the out-of-state session control messages exceeds a third threshold, wherein the third threshold is greater than the second threshold.

14. The network device of claim 8, wherein the processor is configured to:
determine a number of out-of-state session control messages for the plurality of dialog IDs; and
determine the distribution of the number of out-of-state session control messages across the plurality of dialog IDs; and
change the threshold based on the distribution of the number of out-of-state session control messages.

15. A method comprising:
receiving session control messages;
counting the session control messages having a same transaction identifier (ID);
blocking the session control messages having the same transaction ID when a count of the session control messages having the same transaction ID exceeds a threshold;
counting a number out-of-state or blocked session control messages for each of a plurality of dialog IDs;
determining a distribution of the number of out-of-state or blocked session control messages across the plurality of dialog IDs and
changing the threshold based on the distribution of the number of out-of-state or blocked session control messages, wherein changing the threshold based on the distribution includes:
increasing the threshold based on the distribution of the number of blocked or out-of state session control messages across the plurality of dialog IDs when the distribution is a first distribution; and
decreasing the threshold based on the distribution of the number of blocked or out-of state session control messages across the plurality of dialog IDs when the distribution is a second distribution,
wherein the first distribution is broader than the second distribution.

16. The method of claim 15, further comprising determining whether blocked session control messages are associated with an anomalous event and, when the blocked session control messages are not associated with the anomalous event, increasing the threshold.

17. The method of claim 16, further comprising:
decreasing the threshold when the blocked session control messages are associated with the anomalous event.

18. The method of claim 16,
wherein counting the session control messages having the same transaction ID includes counting, for each of a plurality of dialog IDs, the session control messages having a same transaction ID.

19. The method of claim 15, wherein changing the threshold further comprises:
changing the threshold based on the distribution of the number of out-of-state session control messages across the plurality of dialogs.

20. The method of claim 15, wherein changing the threshold further comprises:
changing the threshold based on the distribution of a number of blocked session control messages across the plurality of dialogs.

21. The method of claim 15,
wherein receiving the session control messages includes receiving the session control messages to establish a session between two network devices in a network, wherein the method further comprises:
changing the threshold based on: a number of hops in the network between the two network devices, a latency in the network between the two network devices, or a jitter associated with the network between the two network devices.

22. The method of claim 1,
wherein the first type of session control message is an INVITE message; and
wherein the second type of session control message is one of a TRYING message, a RINGING message, or an OK message.

23. The network device of claim 12, wherein the processor is configured to:
determine whether blocked session control messages are associated with an anomalous event and, when the blocked session control messages are not associated with the anomalous event, increase the threshold; and
decrease the threshold when the blocked session control messages are associated with the anomalous event.

24. The method of claim 20, further comprising:
determining whether blocked session control messages are associated with an anomalous event and, when the blocked session control messages are not associated with the anomalous event, increasing the threshold; and
decreasing the threshold when the blocked session control messages are associated with the anomalous event.

\* \* \* \* \*